United States Patent
Chatterjee et al.

(10) Patent No.: US 12,543,188 B2
(45) Date of Patent: *Feb. 3, 2026

(54) ENHANCEMENT OF PERFORMANCE OF ULTRA-RELIABLE LOW-LATENCY COMMUNICATION

(71) Applicant: Apple Inc., Cupertino, CA (US)

(72) Inventors: Debdeep Chatterjee, San Jose, CA (US); Sergey Panteleev, Nizhny Novgorod (RU); Gang Xiong, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/407,176

(22) Filed: Jan. 8, 2024

(65) Prior Publication Data
US 2024/0147488 A1    May 2, 2024

Related U.S. Application Data

(63) Continuation of application No. 17/692,673, filed on Mar. 11, 2022, now Pat. No. 11,917,642, which is a
(Continued)

(51) Int. Cl.
*H04W 72/23* (2023.01)
*H04L 5/00* (2006.01)
(Continued)

(52) U.S. Cl.
CPC ............. *H04W 72/23* (2023.01); *H04L 5/001* (2013.01); *H04L 5/0053* (2013.01);
(Continued)

(58) Field of Classification Search
CPC ..... H04W 74/08; H04W 24/10; H04W 24/08; H04W 72/231; H04W 52/146; H04L 5/00
See application file for complete search history.

(56) References Cited

U.S. PATENT DOCUMENTS

| 10,716,133 B2 | 7/2020 | Chatterjee et al. |
| 11,291,034 B2 | 3/2022 | Chatterjee et al. |

(Continued)

*Primary Examiner* — Iqbal Zaidi
(74) *Attorney, Agent, or Firm* — Kowert, Hood, Munyon, Rankin & Goetzel, P.C.

(57) ABSTRACT

The disclosure describes mechanisms for reliability enhancement on control channel and data channel and mechanisms in URLLC. An apparatus of a RAN node for URLLC includes baseband circuitry to configure at least one DCI for scheduling transmission of at least one PDSCH content having same information. For each DCI, the baseband circuitry determines a CORESET for transmitting the DCI. The disclosure further describes mechanisms for the support of low latency transmission in URLLC. To improve peak data rate and spectrum efficiency in FDD system, the RAN node configures a DCI for scheduling data transmission using blank resources of a self-contained slot structure. Further, CBG-based transmission with separate HARQ-ACK feedback is provided to configure a DCI for scheduling data transmission of a TB and to divide the TB into multiple CBGs, and to configure uplink control data to carry separate HARQ feedback for the CBGs.

18 Claims, 20 Drawing Sheets

Related U.S. Application Data continuation of application No. 16/907,206, filed on Jun. 20, 2020, now Pat. No. 11,291,034, which is a continuation of application No. 16/126,472, filed on Sep. 10, 2018, now Pat. No. 10,716,133.

(60) Provisional application No. 62/567,163, filed on Oct. 2, 2017, provisional application No. 62/556,175, filed on Sep. 8, 2017.

(51) Int. Cl.
*H04L 5/14* (2006.01)
*H04W 72/0446* (2023.01)

(52) U.S. Cl.
CPC ............. *H04L 5/0094* (2013.01); *H04L 5/14* (2013.01); *H04W 72/0446* (2013.01); *H04L 5/0023* (2013.01)

(56) References Cited

U.S. PATENT DOCUMENTS

| | | | |
|---|---|---|---|
| 2018/0183551 A1* | 6/2018 | Chou | H04L 5/001 |
| 2019/0058517 A1* | 2/2019 | Kang | H04L 5/0094 |
| 2019/0124647 A1* | 4/2019 | Li | H04L 1/1825 |
| 2020/0252180 A1* | 8/2020 | Takeda | H04W 72/12 |

* cited by examiner

ENHANCEMENT OF PERFORMANCE OF ULTRA-RELIABLE LOW-LATENCY COMMUNICATION

REFERENCE TO RELATED APPLICATIONS

This application is a continuation of U.S. patent application Ser. No. 17/692,673, entitled, "Enhancement of Performance of Ultra-Reliable Low-Latency Communication", filed Mar. 11, 2022, which is a continuation of U.S. patent application Ser. No. 16/907,206, entitled, "Enhancement of Performance of Ultra-Reliable Low-Latency Communication", filed Jun. 20, 2020, (now U.S. Pat. No. 11,291,034), which is a continuation of U.S. patent application Ser. No. 16/126,472, entitled "Enhancement of Performance of Ultra-Reliable Low-Latency Communication", filed Sep. 10, 2018, (now U.S. Pat. No. 10,716,133), which claims the benefit of U.S. Provisional Application No. 62/556,175 filed Sep. 8, 2017, entitled "Reliability Enhancement for Ultra-Reliable Low Latency Communications Control and Data Channels", and U.S. Provisional Application No. 62/567,163 filed Oct. 2, 2017, entitled "Support of Low Latency Communication for a Frequency Division Duplexing (FDD) System", the contents of which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

This disclosure is related generally to wireless communication, and more specifically to ultra-reliable low-latency communication.

BACKGROUND ART

Mobile communication has evolved significantly from early voice systems to today's highly sophisticated integrated communication platform. The next generation wireless communication system, for example, fifth generation (5G) or new radio (NR) communication system, provides access to information and sharing of data anywhere, anytime by various users and applications. Specifically, the NR communication system is expected to be a unified network system that targets meeting different and sometimes conflicting performance dimensions and services. Such diverse multi-dimensional requirements are driven by different services and applications. In general, the NR communication system may evolve to have additional new Radio Access Technologies (RATs) based on 3GPP LTE-Advanced so as to provide better, simple and seamless wireless connectivity solutions.

BRIEF DESCRIPTION OF THE DRAWINGS

Other features and advantages of the disclosure will become apparent in the following detailed description of the embodiments with reference to the accompanying drawings, of which.

DESCRIPTION OF THE EMBODIMENTS

Figure 1:
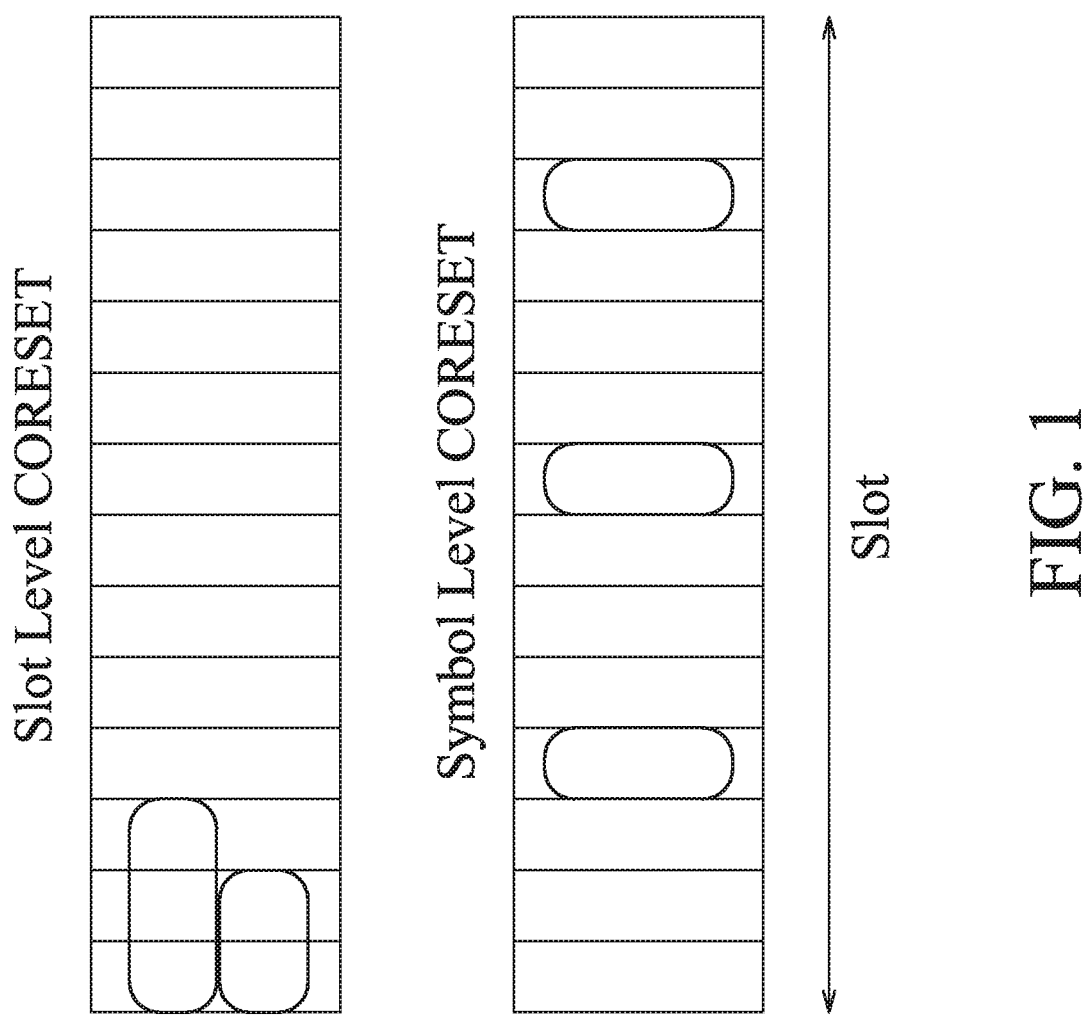
FIG. 1 illustrates slot level CORESET configuration and symbol level CORESET configuration within a slot.

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology used herein is for the purpose of describing particular examples only and is not intended to be limiting.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means A, B, or A and B.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Fifth Generation (5G) New Radio (NR) wireless communication systems are expected to satisfy several use cases, such as enhanced Mobile Broadband (eMBB) and ultra-reliable and low-latency communications (URLLC). However, eMBB and URLLC have different specifications in terms of user plane latency and coverage levels. The key specification for URLLC relates to user plane latency and reliability. URLLC provides services for latency sensitive devices for applications like factory automation, autonomous driving, and remote surgery, and these applications require sub-millisecond latency with error rates lower than 1 packet loss in $10^6$ packets. For example, for URLLC, the target for user plane latency is 0.5 ms for uplink (UL) and 0.5 ms for downlink (DL), and the target for reliability is $1 \times 10^{-5}$ within 1 ms. As a result, URLLC services are expected to exploit a shorter transmission time interval (TTI) as compared to the TTI used by eMBB services to satisfy the more stringent latency specification for URLLC.

An exemplary operating environment of the NR wireless communication system includes a user equipment (UE) (e.g., a smart phone) and a radio access network (RAN) node (e.g., a cellular base station). The UE and the RAN node can communicate with each other using URLLC described herein. In some embodiments, the RAN node may include baseband circuitry and radio frequency (RF) circuitry. The baseband circuitry may include an RF interface to send/receive data to/from the RF circuitry, and one or more processors to handle various radio control functions that enable communication with one or more radio networks via the RF circuitry. The radio control functions may include, but are not limited to, signal modulation/demodulation, encoding/decoding, radio frequency shifting, etc. The RF circuitry is configured to enable communication through the wireless connection using modulated electromagnetic radiation. In various embodiments, the RF circuitry may include switches, filters, amplifiers, etc., to facilitate the communication through the wireless connection. In some embodiments, the UE may also have baseband circuitry similar to the baseband circuitry of the RAN node to handle radio control functions, and RF circuitry similar to the RF circuitry of the RAN node to enable communication through the wireless connection.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Reliability Enhancement on Control Channel for URLLC

As defined in the specification of the NR wireless communication system, a control resource set (CORESET) is defined, under a given numerology, as a set of resource element groups (REGs) with one or more symbol durations within which a UE attempts to blindly decode DL control information (DCI). Regarding CORESET configuration, a CORESET can be contiguous or non-contiguous in frequency domain. On the other hand, in time domain, a CORESET can be configured with one or a set of contiguous orthogonal frequency-division multiplexing (OFDM) symbols. In addition, for large carrier bandwidth, a maximum time duration of a CORESET may have 2 symbols; for narrow carrier bandwidth, a maximum time duration of a CORESET may have 3 symbols in order to increase NR physical downlink control channel (PDCCH) capacity. Further, as agreed in the specification of the NR wireless communication system, either time-first or frequency-first REG-to-CCE (control channel element) mapping is supported for the NR PDCCH.

It is agreed in the specification of the NR wireless communication system that data transmission can have minimum duration of 1 symbol and can start at any OFDM symbol. Further, a UE can be configured to perform "DL control channel monitoring" per symbol with respect to the numerology of the DL control channel. In particular, for DL control channel monitoring, a UE may be configured with symbol level CORESET or slot level CORESET with certain offset/periodicity in one slot. FIG. 1 illustrates one example of slot level CORESET configuration and symbol level CORESET configuration within a slot. In the slot level CORESET configuration, a CORESET is transmitted in a slot using first two or three symbols. In the symbol level CORESET configuration, a CORESET is distributed over three separated symbols in one slot so that data transmission can be scheduled at any time, reducing latency.

A UE may be configured with multiple CORESETs within a bandwidth part (BWP). In case that the time and frequency resource for one CORESET is relatively limited, reliability of PDCCH transmission may not be guaranteed when PDCCH content which is used to schedule URLLC data transmission is transmitted in that CORESET. In this case, it may be desirable to transmit multiple DCIs scheduling the same data channel over different CORESETs to enhance stringent reliability.

Various embodiments of mechanisms to enhance reliability on control channel for URLLC in the NR wireless communication system are described in the following.

As mentioned above, a UE may be configured with multiple CORESETs within a BWP. In case when the time and frequency resource configured for one CORESET is relatively limited, when PDCCH used to schedule URLLC data transmission is transmitted in that CORESET, reliability of PDCCH transmission may not be guaranteed. In this case, it may be desirable to transmit the same DCI over multiple CORESETs to meet stringent reliability requirement for DL control channel.

In one embodiment of this disclosure, multiple PDCCH contents (i.e., multiple DCIs) are used to schedule transmission of data on the same data channel (e.g., physical downlink shared channel (PDSCH) and physical uplink shared channel (PUSCH)), and can be transmitted in multiple CORESETs within one or more BWPs. In particular, the DCIs are transmitted in different CORESETs, respectively. In some embodiments, the DCIs have the same DCI content. In some embodiments, the DCIs may have different DCI contents. In some embodiments, the CORESETs may be located in the same BWP or respectively in different BWPs.

In one embodiment, the one or more processors of the baseband circuitry of the RAN node are to configure, via a radio resource control (RRC) layer, multiple DCIs for scheduling transmission of one PDSCH content. For each of the DCIs, the one or more processors of the baseband circuitry of the RAN node are to determine a CORESET for transmitting the DCI. In some embodiments, the one or more processors of the baseband circuitry of the RAN node configures the multiple DCIs that have the same DCI content for scheduling transmission of the same PDSCH content within one BWP, and to determine different CORESETs within the BWP for transmitting the DCIs, respectively. In some embodiments, the one or more processors of the baseband circuitry of the RAN node are to determine one component carrier (CC) for transmitting the DCIs. In some embodiments, the one or more processors of the baseband circuitry of the RAN node are to determine different component carriers (CCs) respectively for transmitting the DCIs.

Then, the RF interface of the baseband circuitry of the RAN node receives downlink data from the one or more processors, including the DCIs, and transmits the DL data to the RF circuitry. In response to receipt of the DL data, the RF circuitry of the RAN node transmits, to the UE, the DL data including the DCIs respectively in the CORESETs, and then transmits the PDSCH content to the UE according to the DCIs.

Figure 2:
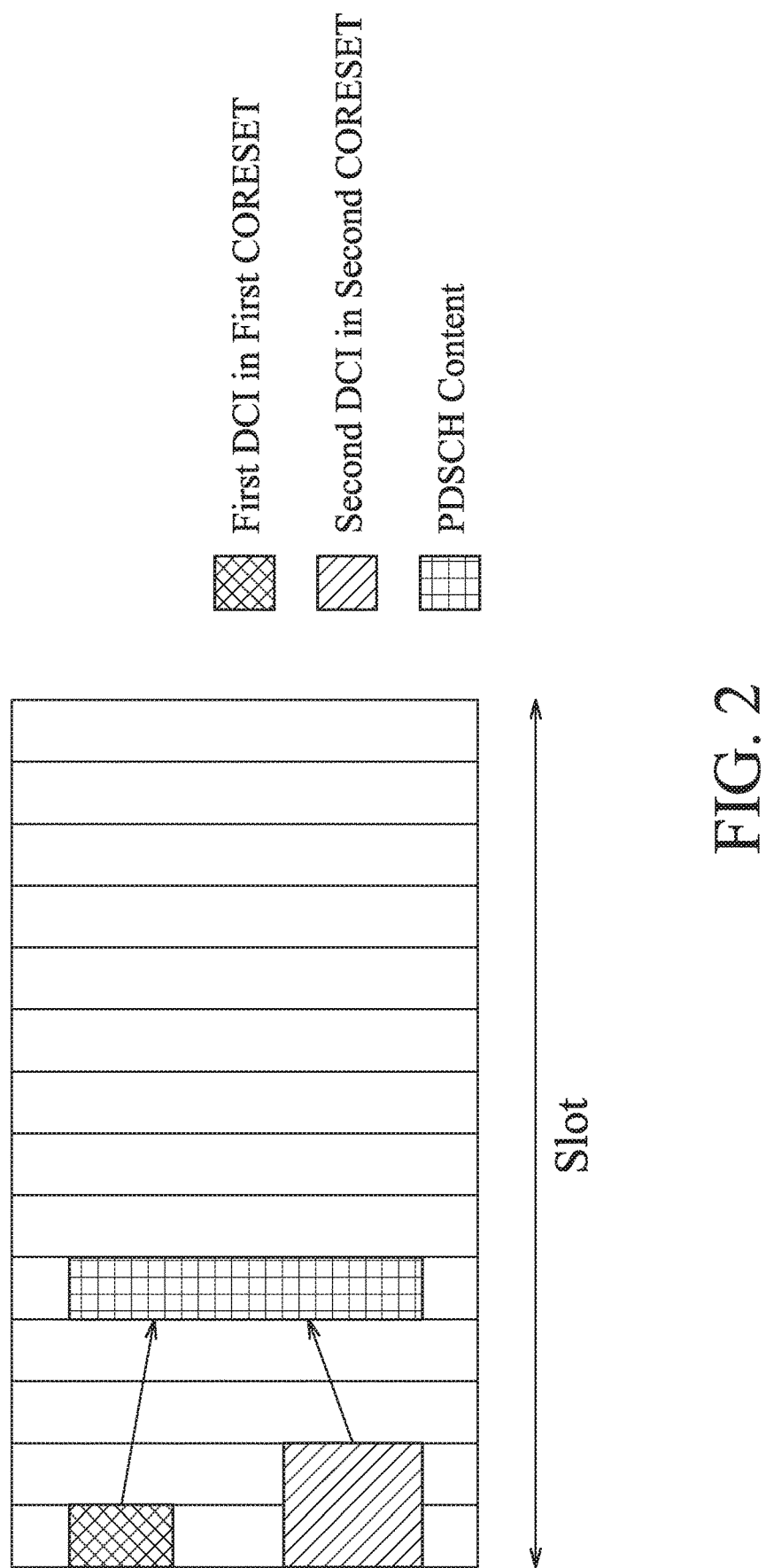
FIG. 2 illustrates one example of multiple PDCCH contents transmitted in different CORESETs for scheduling the same PDSCH content.

FIG. 2 illustrates one example of multiple PDCCH contents (i.e., multiple DCIs) transmitted in different CORESETs for scheduling the same PDSCH content. In this example, first and second DCIs are configured to schedule the same PDSCH content, and the first DCI and the second DCI are transmitted in first and second CORESETs, respectively. In particular, the first and second CORESETs are located within a same BWP.

Figure 3:
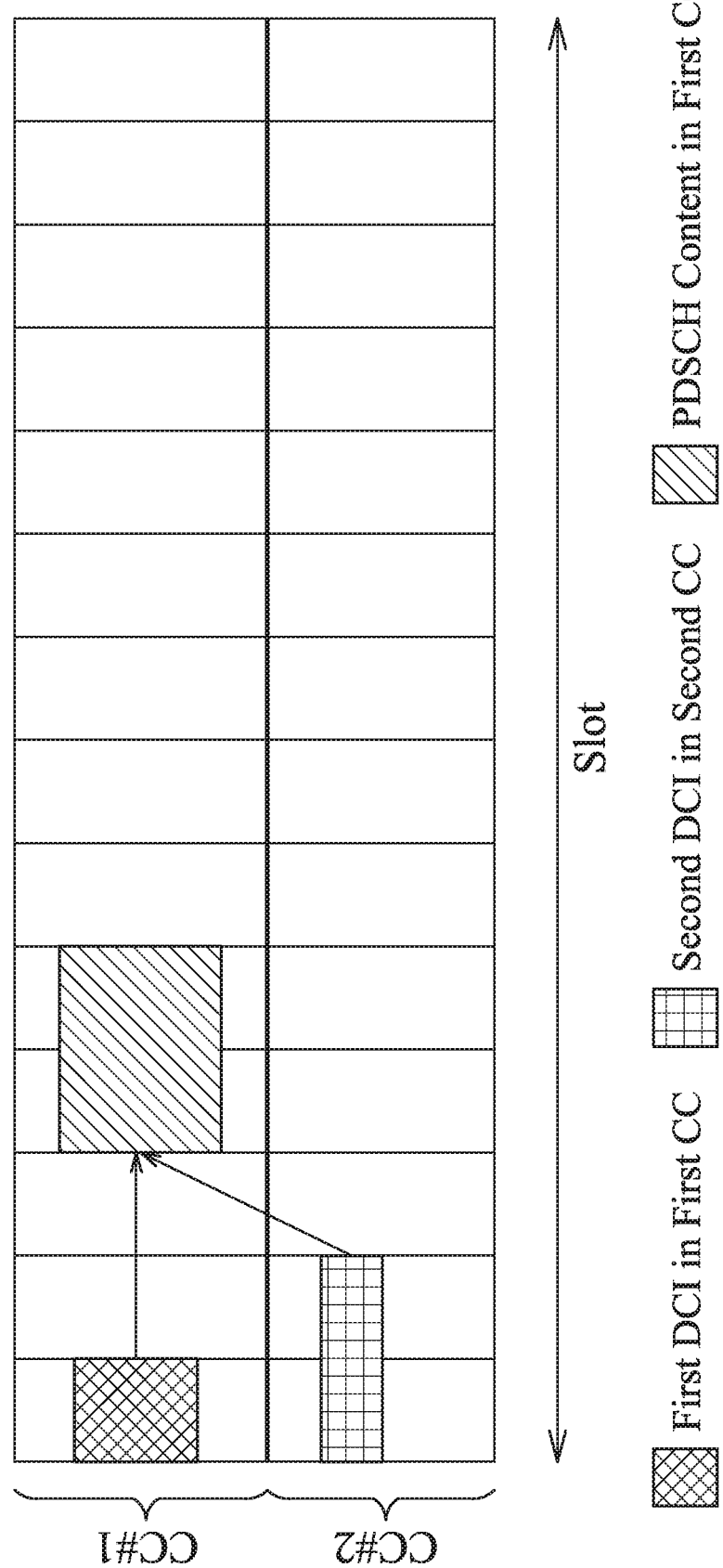
FIG. 3 illustrates one example of multiple PDCCH contents transmitted in different CCs for scheduling the same PDSCH content.

In another embodiment, multiple PDCCH contents (i.e., multiple DCIs) for scheduling data transmission on the same data channel can be transmitted in different CCs in carrier aggregation (CA) scenario. FIG. 3 illustrates one example of multiple DCIs transmitted in different CCs for scheduling the same PDSCH content. In this example, first and second DCIs are transmitted in first and second CCs (CC #1, CC #2), respectively, and are used to schedule the same PDSCH content to be transmitted, for example, in the first CC (CC #1). More specifically, the first DCI is transmitted in a first CORESET in the first CC (CC #1) and the second DCI is transmitted in a second CORESET in the second CC (CC #2). It should be noted that cross-carrier scheduling is employed for the second DCI in the second CC (CC #2).

Depending on the CORESET configuration, the DCIs or CORESETs may be multiplexed in a time division multiplexing (TDM) or frequency division multiplexing (FDM) manner. Further, the DCIs or CORESETs may share the same time and frequency resource, but may be multiplexed in a spatial division multiplexing (SDM) manner. In this case, different beams may be employed for the transmission of the DCIs.

The RF circuitry of the UE receives the DCIs for scheduling DL transmission and then, receives the PDSCH content according to the DCIs, and the baseband circuitry of the UE is to selectively perform soft combining of the DCIs. In some embodiments, when the DCIs have the same DCI content, certain signaling mechanisms can be defined to allow the UE to perform soft combining of the DCIs.

In some embodiments, one or more processors of the baseband circuitry of the UE are configured by RRC data specific to the UE to selectively perform soft combining of the DCIs. In particular, the RRC data is transmitted from the RAN node to the UE through a higher layer by RRC signaling. In some embodiments, for performing soft combining of the DCIs, the UE can also be configured by the RRC data to determine the CORESETs in one or different CCs.

In some embodiments, when different DCIs have the same DCI content pointing to the same PDSCH or PUSCH resource allocation, the one or more processors of the baseband circuitry of the UE can be configured by the RRC data, which is transmitted to the UE through the higher layer by RRC signaling, to process the PDSCH or PUSCH content only once. When some of the DCI contents are different, then the UE can be configured to follow one of the DCIs. For example, the DCI contents may include acknowledgement (ACK)/negative acknowledgement (NACK) timing indication, associated physical uplink control channel (PUCCH) resource, etc. For example, when the PUCCH resources respectively configured to transmit ACK/NACK feedbacks respectively for the DCIs are different, then the UE can be configured to determine whether to utilize only one of the PUCCH resources for transmission or to transmit multiple PUCCH contents including the ACK/NACK feedbacks. In the case that only one PUCCH resource is utilized, which one of the PUCCH resources is utilized should be pre-defined. In one example of pre-definition rule, the UE is configured to determine whether the DCI and/or associated PUCCH resource corresponds to the primary and/or default BWP and/or CC.

In some embodiments, in order to reduce the number of times the UE executes blind decoding and thereby reduce power consumption of the UE, certain PDCCH candidate association among multiple CORESETs or search spaces can be defined. The association rule among different PDCCH candidates in different CORESETs or search spaces may be predefined in the specification or configured by higher layers via NR minimum system information (MSI), NR remaining minimum system information (RMSI), NR other system information (OSI) or radio resource control (RRC) signaling. In some embodiments, the one or more processors of the baseband circuitry of the UE are to perform soft combining of the DCIs according to predefined association among multiple PDCCH candidates respectively in different CORESETs.

Figure 4:
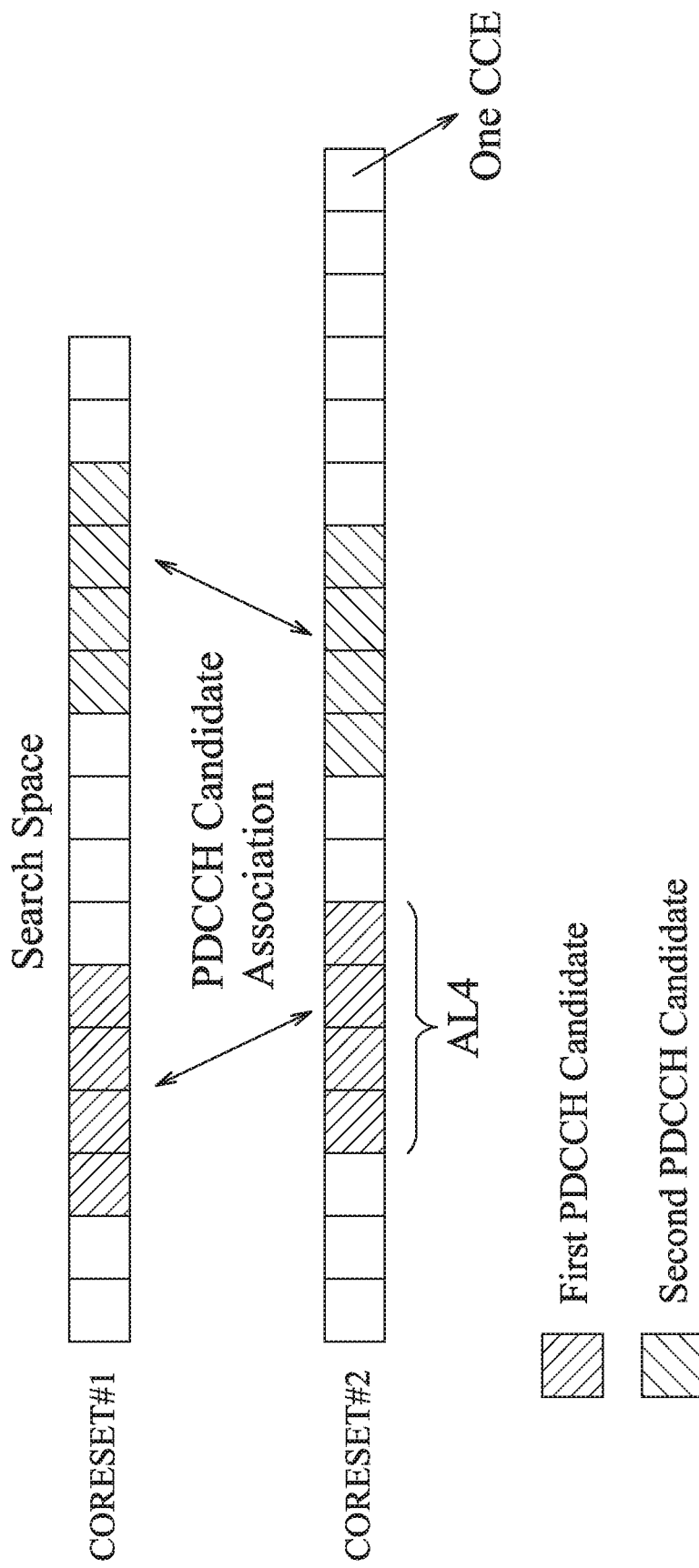
FIG. 4 illustrates association among multiple PDCCH candidates respectively in different CORESETs.

In one embodiment, the PDCCH candidates on the same aggregation level (AL) with the same index from different search spaces or CORESETs can be associated for soft-combining. For instance, as shown in FIG. 4 in which two PDCCH candidates are defined for AL4 in each CORESET or search space, first and second PDCCH candidates for AL4 in the first CORESET or search space (CORESET #1) can be associated with the first and second PDCCH candidates for AL4 in the second CORESET (CORESET #2) or search space, respectively. In other embodiments, PDCCH candidates from different ALs or different indices in different CORESETs or search spaces can be associated for soft-combing. It should be noted that one square block in FIG. 4 represents one control channel element (CCE).

In some embodiments where the UE is configured with multiple BWPs within one CC or multiple CCs for CA scenario, the above-mentioned mechanisms for enhancing reliability on control and data channels can also be applied to the NR wireless communication system.

Reliability Enhancement on Data Channel for URLLC

Various embodiments of mechanisms for reliability enhancement on data channel for URLLC in the NR wireless communication system are described in the following.

In one embodiment, to improve reliability of data channel, multiple PDSCH contents or PUSCH contents with the same information can be scheduled by one or more DCIs. Same redundancy versions (RV) with chase combining or different RVs with incremental redundancy can be applied for transmitting the PDSCH contents or PUSCH contents. It should be noted that the PDSCH contents or PUSCH contents and the DCI(s) may be transmitted in the same or different BWPs within one CC or different CCs in CA scenario.

In one embodiment, the one or more processors of the baseband circuitry of the RAN node configure, via the RRC layer, one or more DCIs for scheduling transmission of multiple PDSCH contents. In particular, the PDSCH contents all have the same information. For each DCI, the one or more processors of the baseband circuitry of the RAN node determine a CORESET for transmitting the DCI.

In some embodiments, the one or more processors of the baseband circuitry of the RAN node configure multiple DCIs that have the same DCI content and that are respectively for scheduling transmission of multiple PDSCH contents having the same information respectively within different BWPs, and determine multiple CORESETs respectively within the BWPs and respectively for transmitting the DCIs. In some embodiments, the one or more processors of the baseband circuitry of the RAN node configure one DCI for scheduling transmission of multiple PDSCH contents having the same information respectively within different BWPs, and determine a CORESET within one of the BWPs for transmitting the DCI.

Then, the RF interface of the baseband circuitry of the RAN node receives downlink data from the one or more processors of the baseband circuitry of the RAN node, including the DCI(s), and transmits the DL data to the RF circuitry of the RAN node. In response to receipt of the DL data, the RF circuitry of the RAN node transmits each DCI in the respective CORESET to the UE, and then transmits the PDSCH contents to the UE according to the DCI(s).

Figure 5:
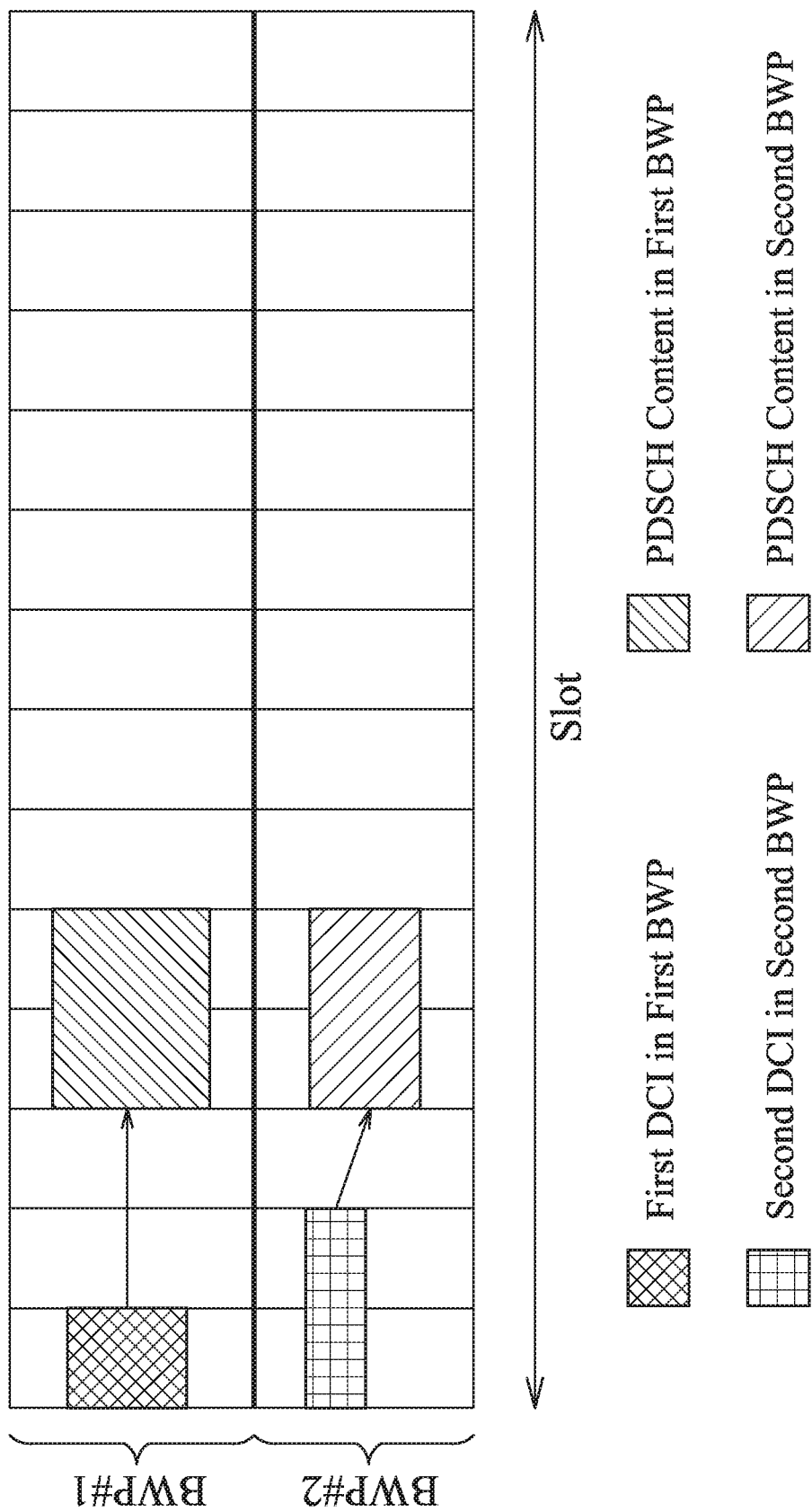
FIG. 5 illustrates one example of multiple PDSCH contents with same information scheduled respectively in different bandwidth parts.
Figure 6:
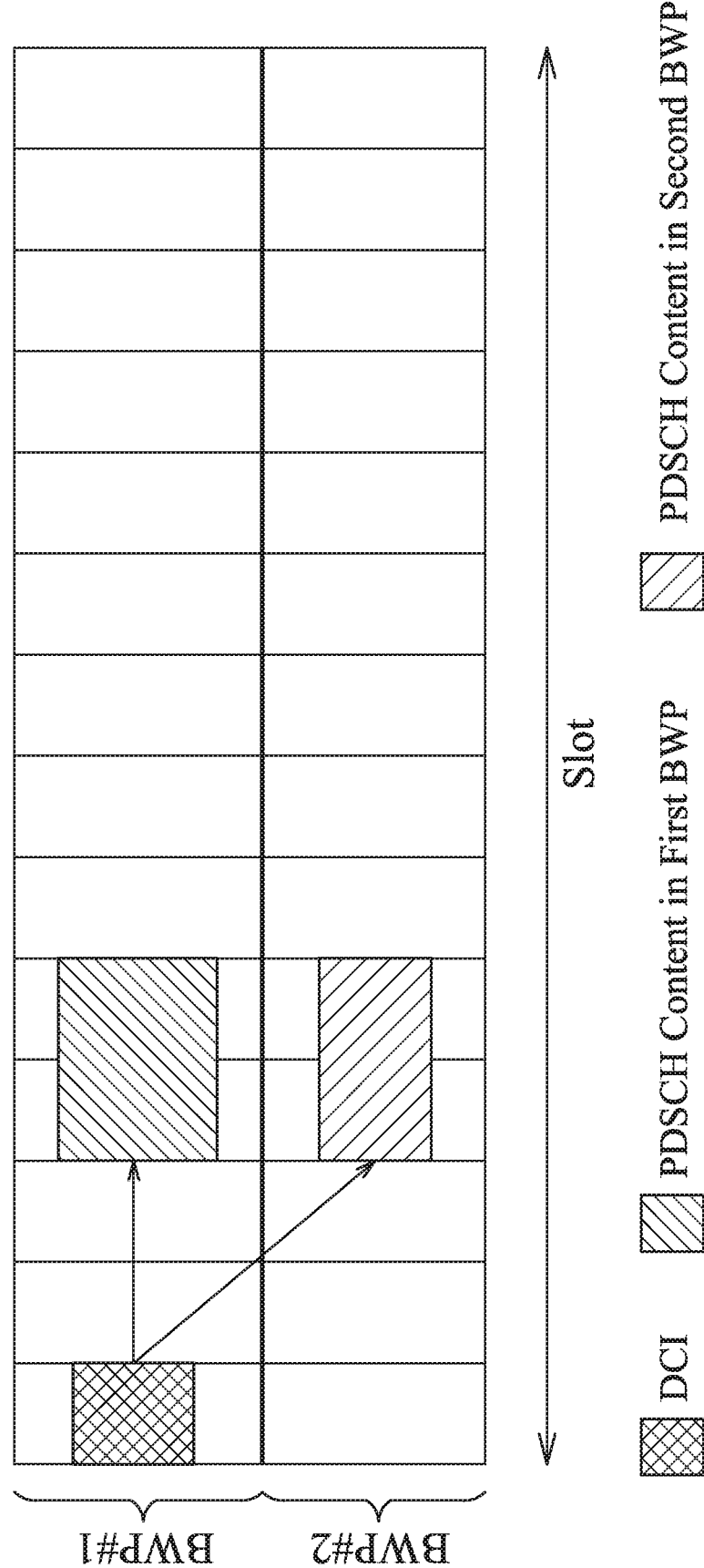
FIG. 6 illustrates one example of multiple PDSCH contents with same information scheduled respectively in different BWPs using one DCI.

FIG. 5 illustrates one example of multiple PDSCH contents (or PUSCH contents) with the same information scheduled in different BWPs. In particular, the PDSCH contents are scheduled using different DCIs, respectively. In the example of FIG. 5, a first DCI in a first BWP (BWP #1) is used to schedule transmission of the PDSCH content in the first BWP (BWP #1), and a second DCI in a second BWP (BWP #2) is used to schedule transmission of the PDSCH content in the second BWP (BWP #2). FIG. 6 illustrates one example of multiple PDSCH contents with the same information scheduled respectively in different BWPs using one DCI. In the example of FIG. 6, the DCI in the first BWP (BWP #1) is used to schedule the PDSCH content in the first BWP (BWP #1) and the PDSCH content in the second BWP (BWP #2). In particular, the PDSCH content in the first BWP (BWP #1) and the PDSCH content in the second BWP (BWP #2) carry the same information.

It should be noted that the above-mentioned embodiments of the mechanisms for enhancing reliability on data channel for URLLC can be applied to the case that the same numerology is employed in different BWPs and to the case that different numerologies are employed in different BWPs.

When the multiple PDSCH contents (or PUSCH contents) in different BWPs or CCs carry the same information, the receiver (i.e., the UE for the PDSCH contents or the RAN node for the PUSCH contents) can be configured to perform soft combining of the PDSCH contents (or PUSCH contents) so as to further improve reliability of data transmission. In one embodiment, whether to perform soft combing for the PDSCH contents (or PUSCH contents) carrying the same information can be configured by higher layers via UE specific RRC signaling or indicated by the scheduling DCI or a combination thereof. The scheduling DCI is the DCI(s) used to schedule the PDSCH contents (or PUSCH contents).

The RF circuitry of the UE receives the DCI(s) for scheduling DL transmission and then, receives the PDSCH contents according to the DCI(s), and the baseband circuitry of the UE is to selectively perform soft combining of the DCIs. In some embodiments, the one or more processors of the baseband circuitry of the UE are configured by RRC data specific to the UE to selectively perform soft combining of the PDSCH contents.

In some embodiments, association between the CCs or BWPs can be predefined in the specification or configured by higher layers via MSI, RMSI, OSI or RRC signaling or dynamically indicated in the DCI or a combination thereof. For example, a number N of BWPs or CCs can be associated with each other to allow the receiver to perform soft combing of the PDSCH or PUSCH contents with the same information, where N can be predefined in the specification or configured by higher layers via MSI, RMSI, OSI or RRC signaling, e.g., N=2. In one embodiment, the receiver is configured by higher layers via RRC signaling to determine which BWPs or CCs can be associated for the transmission of the PDSCH or PUSCH contents with the same information.

Further, one field in each DCI for scheduling the PDSCH or PUSCH contents can be used to dynamically indicate whether the PDSCH or PUSCH contents with the same information are transmitted in the configured CCs or BWPs. The field in the DCI may be a one bit indicator to dynamically indicate whether the PDSCH or PUSCH contents with the same information are transmitted in the configured BWPs or CCs. Alternatively, the field may be a bitmap and each bit in the bitmap can be used to indicate whether the configured BWPs or CCs are used for the transmission of the PDSCH or PUSCH contents with the same information. In some embodiments, the bit indicator of each DCI can be further used to allow the UE to perform soft combining on these PDSCHs.

It should be noted that the field may be included in one or more DCIs that are configured to schedule the PDSCH or PUSCH contents with the same information. In case when multiple DCIs are used for the scheduling of the PDSCH or PUSCH contents with the same information, the fields of some of the DCIs may be the same to allow the receiver to further ensure that soft combining of the PDSCH or PUSCH contents can be performed. For instance, a hybrid automatic repeat request (HARQ) process identifier (ID) and/or a new data indicator (NDI) can be identical among the DCIs. Further, Redundancy version (RV) may be the same or different depending on whether chase combining or incremental redundancy is employed.

In the case that one DCI is used to schedule the PDSCH or PUSCH contents with the same information in different BWPs or CCs, same or different resource allocation information in different BWPs or CCs can be included in the DCI. The same resource allocation for scheduling the PDSCH or PUSCH contents in different CCs or BWPs can facilitate reducing signaling overhead. Further, an RV pattern can be defined to further reduce the signaling overhead. For instance, the RV pattern on multiple BWPs or CCs can be defined as [0 2 3 1], where RV 0 is used for the PDSCH content in the first BWP or CC and RV 2 is used for the PDSCH content in the second BWP or CC, etc. In one embodiment, when the multiple DCIs with the same DCI content pointing to the same PDSCH resource allocation for the downlink transmission, the one or more processors of the baseband circuitry of the UE process only one of the PDSCH contents.

In one example, three BWPs (e.g., BWP #0, BWP #1, BWP #2) are configured for a given UE, and BWP #0 and BWP #2 are configured, by the RRC layer, to be associated for the transmission of the PDSCH or PUSCH contents with the same information. Further, a bit indicator can be included in the DCI(s) for scheduling of the PDSCH or PUSCH contents in BWP #0 and BWP #2. When a value of the bit indicator is "1", the bit indicator indicates that the PDSCH or PUSCH contents with the same information are transmitted in BWP #0 and BWP #2 and a receiver (recipient device) can perform soft combining of the PDSCH or PUSCH contents in these two BWPs. On the other hand, when the value of the bit indicator is "0", the bit indicator indicates that the PDSCH or PUSCH contents with the same information are not transmitted in BWP #0 and BWP #2 and the receiver may not perform soft combining of the PDSCH or PUSCH contents in these two BWPs.

In another embodiment, the association and consequent combining of the PDSCH or PUSCH contents scheduled by different DCIs can be achieved using the same HARQ process ID across multiple BWPs or CCs. In such case, if a UE receives more than one DCI with the same HARQ process ID, the UE can be configured to assume that the corresponding PDSCH or PUSCH contents can combined. In a case that the DCIs are received in the same CC or BWP, the same HARQ process ID can be safely used for the association and consequent combining of the PDSCH or PUSCH contents. However, in a case that the DCIs are received in different BWPs and/or CCs, the HARQ process ID can be specific to each BWP/CC, and some HARQ process IDs can be configured to be shared between the BWPs or CCs.

Support of Low Latency Communication for FDD System

In order to enable low latency transmission for enhanced mobile broadband communication (e.g., URLLC), self-contained slot structure was introduced in NR time division duplex (TDD) system.

Figure 7:
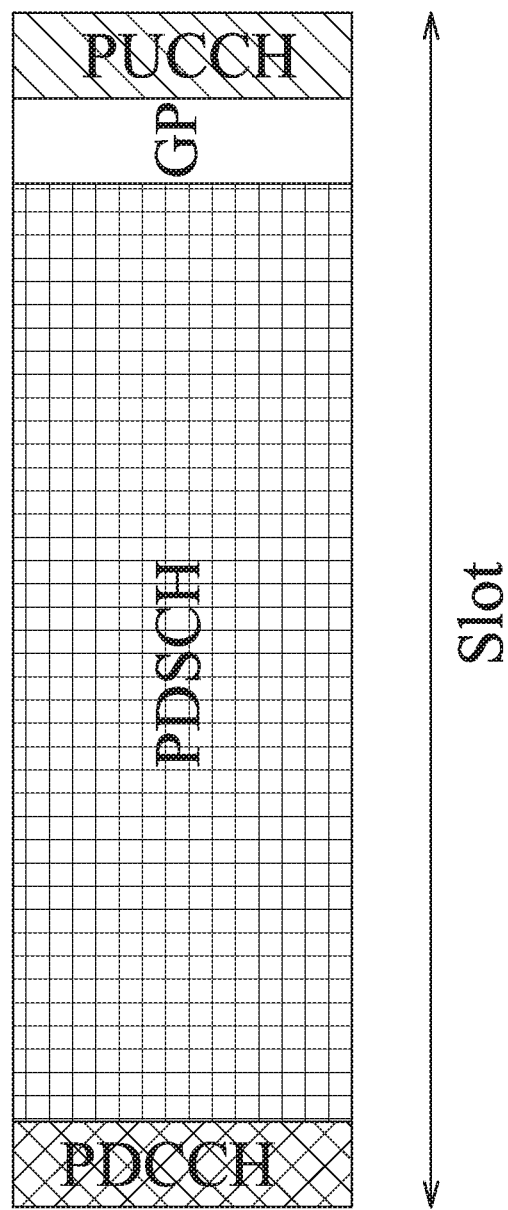
FIG. 7 illustrates one example of self-contained slot structure for TDD system.

To enable low latency transmission for enhanced mobile broadband communication, self-contained slot structure was introduced in NR time division duplex (TDD) system. FIG. 7 illustrates one example of self-contained slot structure in a downlink (DL) channel for the TDD system. In particular, the PDSCH content is scheduled by the PDCCH content, and is transmitted right after the PDCCH content. A guard period (GP) is inserted between the PDSCH content and the PUCCH content in order to accommodate DL-to-UL switching time or UL-to-DL switching time or round-trip propagation delay.

Regarding fully self-contained slot structure, after decoding the PDSCH content, the UE feedbacks the HARQ ACK/NACK in the PUCCH content in the last part of subframe. This type of slot structure may be more desirable for supporting low latency transmission.

Figure 8:
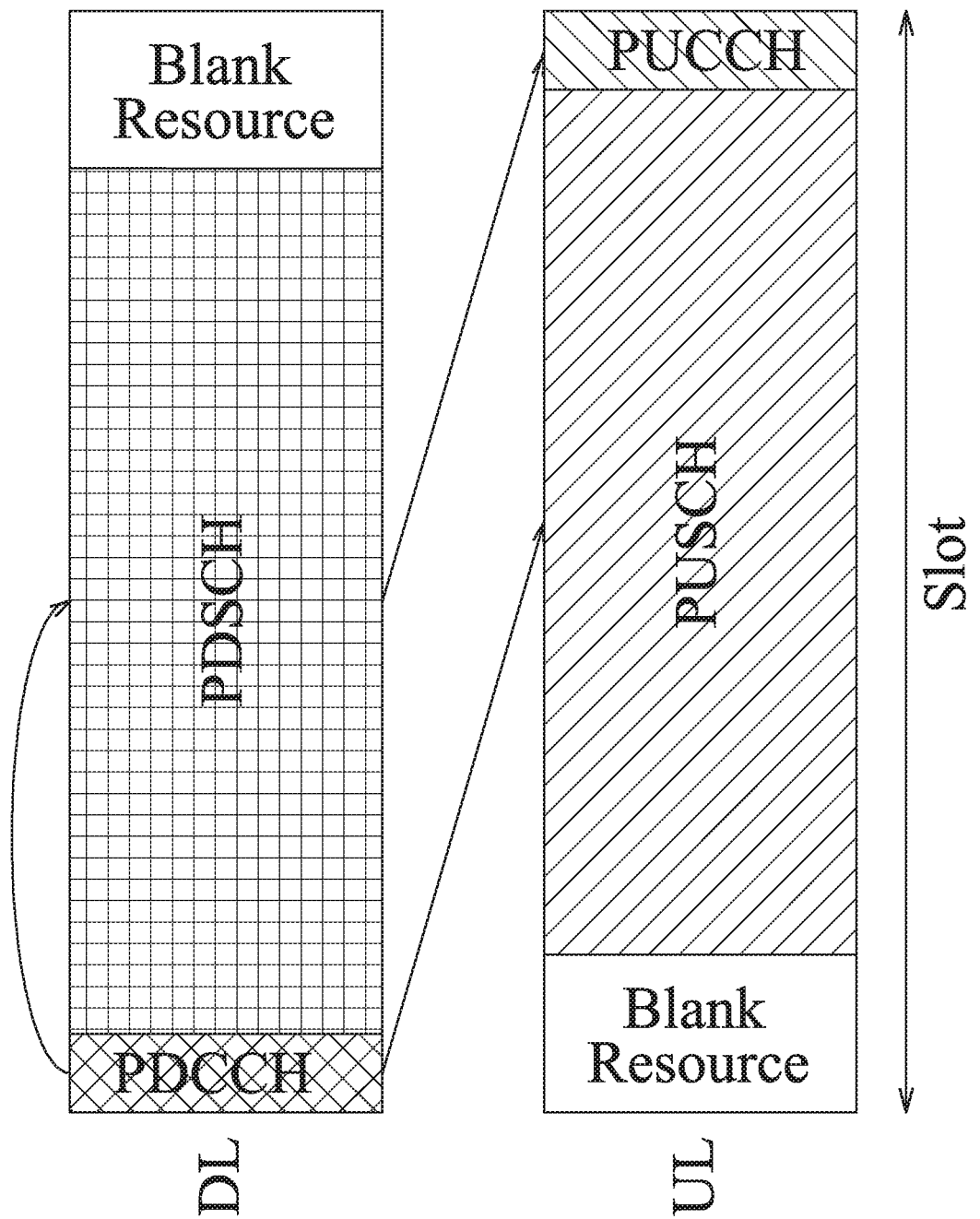
FIG. 8 illustrates one example of self-contained slot structure for FDD system.

In order to accomplish the self-contained slot structure in the FDD system, the PUCCH is used to carry HARQ-ACK feedback for the corresponding PDSCH transmission in the same slot. Similarly, the PDCCH content can be used to schedule transmission of the PUSCH content in the same slot. FIG. 8 illustrates one example of self-contained slot structure for the FDD system. As shown in FIG. 8, certain blank resources are reserved in DL and UL. The blank resource in DL allows the UE to process the decoding of the PDSCH content and the HARQ-ACK feedback on the PUCCH content. The blank resource in UL allows the UE to decode the PDCCH content and transmit the PUSCH content. It can be seen that resource utilization of a UE using the self-contained slot structure with single HARQ process as shown in FIG. 8 is lower than resource utilization of UE using the self-contained slot structure for the TDD system as shown in FIG. 7. To improve the data rate for a UE, it is desirable to allocate data transmission in the reserved blank resources. Accordingly, the following provides various embodiments of mechanisms on support of low latency communication for the NR FDD system, including non-slot-based scheduling on blank resources and code block group (CBG) (re)transmission with separate HARQ-ACK feedback.

Non-Slot-Based Scheduling on Blank Resources

In order to improve peak data rate and spectrum efficiency in the FDD system, data transmission can be scheduled in the blank resources of the self-contained slot structure shown in FIG. 8. More specifically, non-slot-based scheduling is provided to schedule the data transmission within the blank resources for same or different UEs in the same slot. The term "non-slot-based scheduling" is related to scheduling of data transmission having a duration that is relatively short (e.g., one or two symbols) in one slot.

The one or more processors of the baseband circuitry of the RAN node configure a DCI for scheduling data transmission using blank resources of a self-contained slot structure, and determine a CORESET for transmitting the DCI in a first slot. In some embodiments, the one or more processors of the baseband circuitry of the RAN node configure a first DCI for slot-based scheduling of transmission of a PDSCH content in the first slot, and configure a second DCI for non-slot-based scheduling of transmission of a second PDSCH content within blank resource of the first slot. In some embodiments, the one or more processors of the baseband circuitry of the RAN node determine the CORESET in the middle of the first slot for transmitting the DCI, and configure the DCI for non-slot-based scheduling of transmission of a PUSCH content within blank resource of a second slot immediately next to the first slot.

Figure 9:
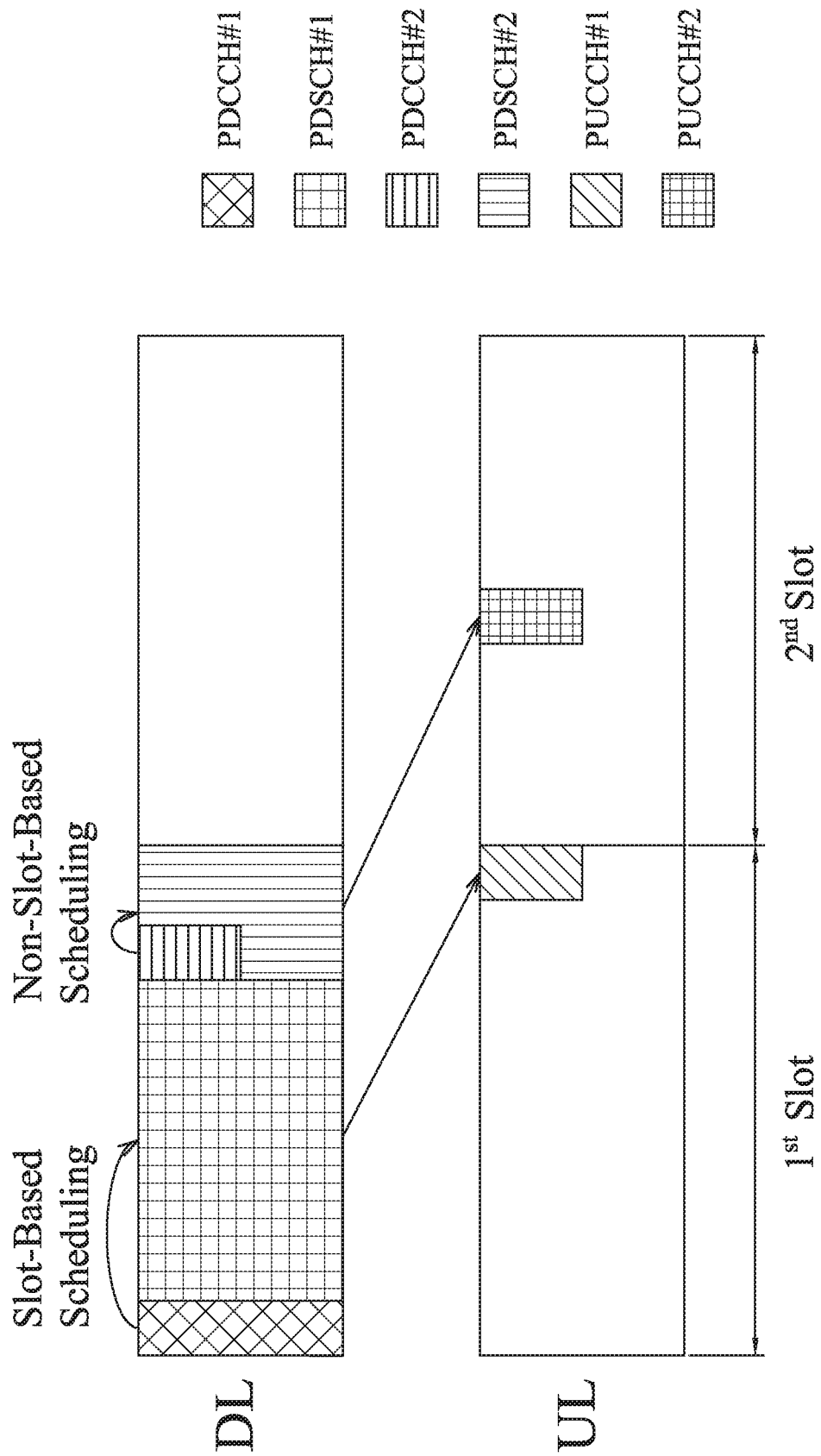
FIG. 9 illustrates one example of non-slot based scheduling on blank resources.

FIG. 9 illustrates one example of non-slot-based scheduling on blank resources. In the example shown in FIG. 9, a first PDCCH content (PDCCH #1) is transmitted in the beginning of a first slot for scheduling transmission of a first PDSCH content (PDSCH #1) (slot-based scheduling), and a second PDCCH content (PDCCH #2) is transmitted in the middle of the first slot for scheduling transmission of a second PDSCH content (PDSCH #2) (non-slot-based scheduling). In particular, for non-slot-based scheduling, the second PDCCH content (PDCCH #2) is transmitted within the blank resource of the first slot for scheduling transmission of the second PDSCH content (PDSCH #2) in the blank resource of the first slot. As a result, for DL transmission, non-slot-based scheduling can be used to fill in the blank resource. Further, a first PUCCH content (PUCCH #1) carrying HARQ-ACK feedback for the slot-based scheduling of the first PDSCH content (PDSCH #1) can be transmitted in the last part of the first slot. In addition, a second PUCCH content (PUCCH #2) carrying HARQ-ACK feedback for non-slot-based scheduling of the second PDSCH content (PDSCH #2) can be transmitted in the middle or last part of a second slot that is immediately next to the first slot. It should be noted that each of the first and second PUCCH contents (PUCCH #1, PUCCH #2) can be in either a short PUCCH format or a long PUCCH format.

As currently defined in the specification for the NR system, a PDSCH demodulation reference signal (DMRS) used to demodulate the PDSCH content is transmitted in the third or fourth symbol of the slot when the PDSCH content is scheduled by slot-based scheduling. On the other hand, when a PDSCH content is scheduled by non-slot-based scheduling, a PDSCH DMRS is transmitted in the first symbol of the PDSCH content. For example, transmission of a first PDSCH content follows slot-based scheduling at least with respect to location of a first PDSCH DMRS that is transmitted in the third or fourth symbol of the slot, and transmission of a second PDSCH content may follow non-slot-based scheduling at least with respect to location of a second PDSCH DMRS in the first symbol of the second PDSCH content. Alternatively, in the case that the second PDSCH content is quasi-co-located with the first PDSCH content (e.g., transmitted by the same antenna port), the second PDSCH content may not contain any DMRS and can be demodulated according to the PDSCH DMRS included in the first PDSCH content. The latter case is more suitable for a joint time-domain resource allocation indication for the multiple PDSCH contents. In another embodiment, both PDSCH contents may follow non-slot-based scheduling at least with respect to the location of the DMRS that is transmitted in the first symbol of the PDSCH.

Figure 10:
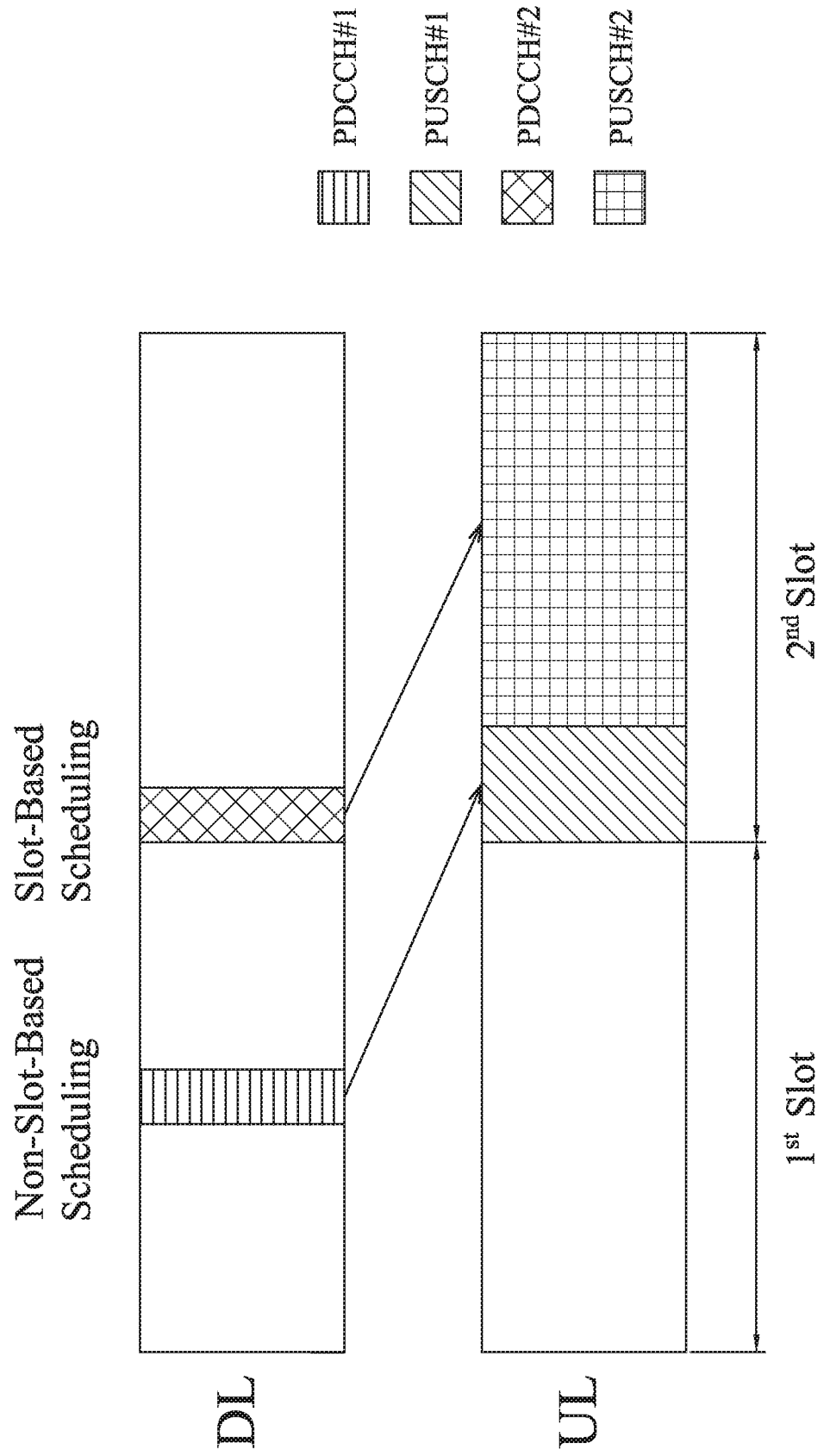
FIG. 10 illustrates another example of non-slot based scheduling on blank resources.

FIG. 10 illustrates another example of non-slot-based scheduling on blank resources. In the example of FIG. 10, a first PDCCH content (PDCCH #1) is transmitted in the middle of a first slot for scheduling transmission of a first PUSCH content (PUSCH #1) in the blank resource of a second slot that is immediately next to the first slot (non-slot-based scheduling). Further, a second PDCCH content (PDCCH #2) is transmitted in the beginning of the second slot for scheduling transmission of a second PUSCH content (PUSCH #2) in the second slot. Similarly, for UL transmission, non-slot-based scheduling can be used to fill in the blank resource. Further, cross-symbol or cross-slot scheduling can be used for UL transmission.

Figure 11:
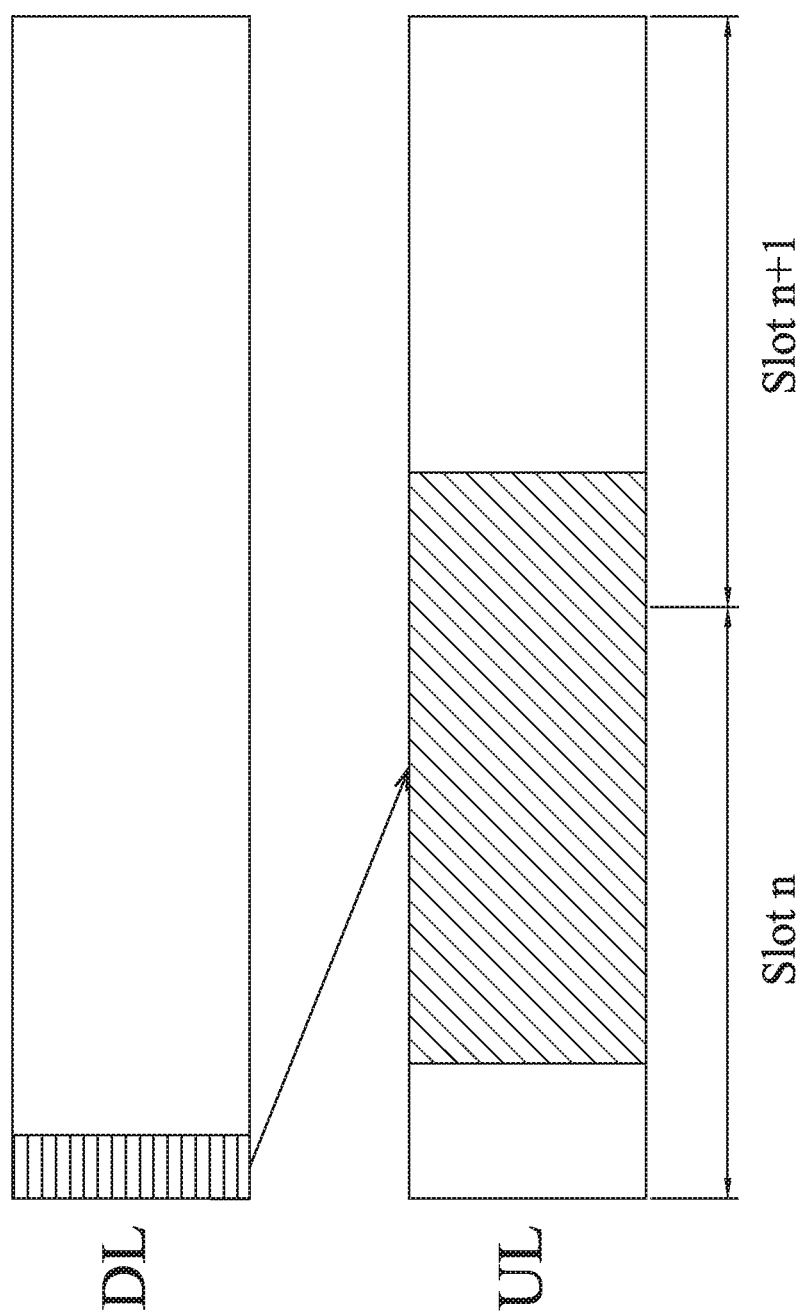
FIG. 11 illustrates one example of UL data transmission across slot boundary.

In some embodiments, the one or more processors of the baseband circuitry of the RAN node configure the DCI for scheduling uplink data transmission in two successive slots across slot boundary between the two slots. The UL data transmission may be scheduled across the slot boundary. FIG. 11 illustrates one example of UL data transmission across slot boundary to fill the blank resource at the beginning of a slot. In this example, the UL data transmission spans two successive slots (e.g., slot n and slot n+1). In particular, in slot n, the UL data transmission is scheduled from the $k^{th}$ symbol to the last symbol of slot n (i.e., symbol #13). In slot n+1, the UL data transmission is scheduled from the first symbol (symbol #0) to the $(k-1)^{th}$ symbol, filling the blank resource in slot n+1.

Figure 12:
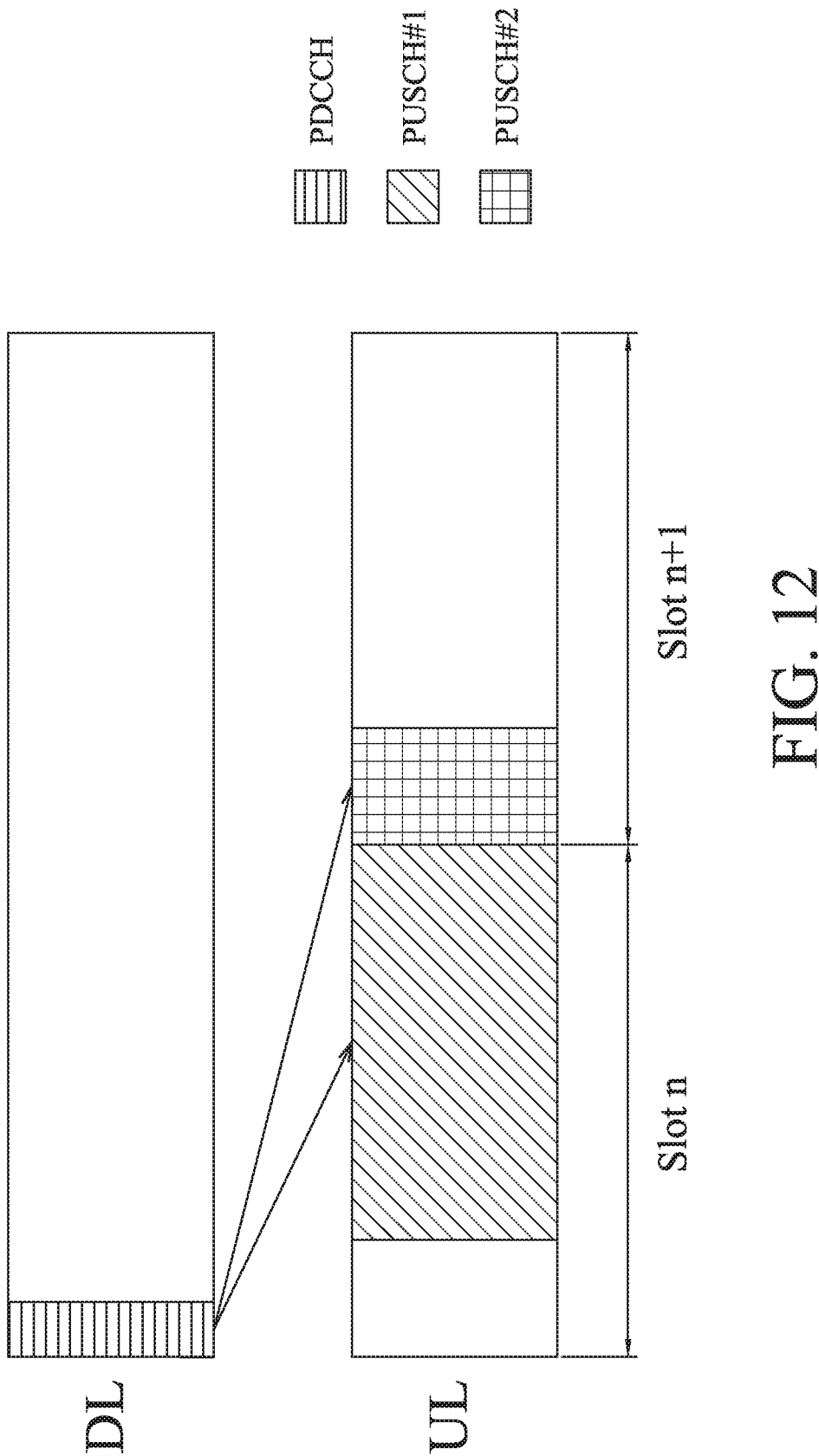
FIG. 12 illustrates one example of UL data transmission using multi-PUSCH scheduling.

In some embodiments, the one or more processors of the baseband circuitry of the RAN node configure the DCI for scheduling first uplink data transmission in a first slot (e.g., slot n) and scheduling second uplink data transmission in blank resource of a second slot (e.g., slot n+1) that is immediately next to the first slot (multi-PUSCH scheduling). Using multi-PUSCH scheduling to schedule the second UL data transmission can fill the blank resource at the beginning of the second slot. FIG. 12 illustrates one example of UL data transmission using multi-PUSCH scheduling. In the example of FIG. 12, the DCI included in the PDCCH content is configured to schedule UL data transmission of a first PUSCH content (PUSCH #1) in slot n, and UL data transmission of a second PUSCH content (PUSCH #2) in slot n+1. In particular, the first PUSCH content (PUSCH #1) and the second PUSCH content (PUSCH #2) have different information.

CBG Based Transmission with Separate HARQ-ACK Feedback

Figure 13:
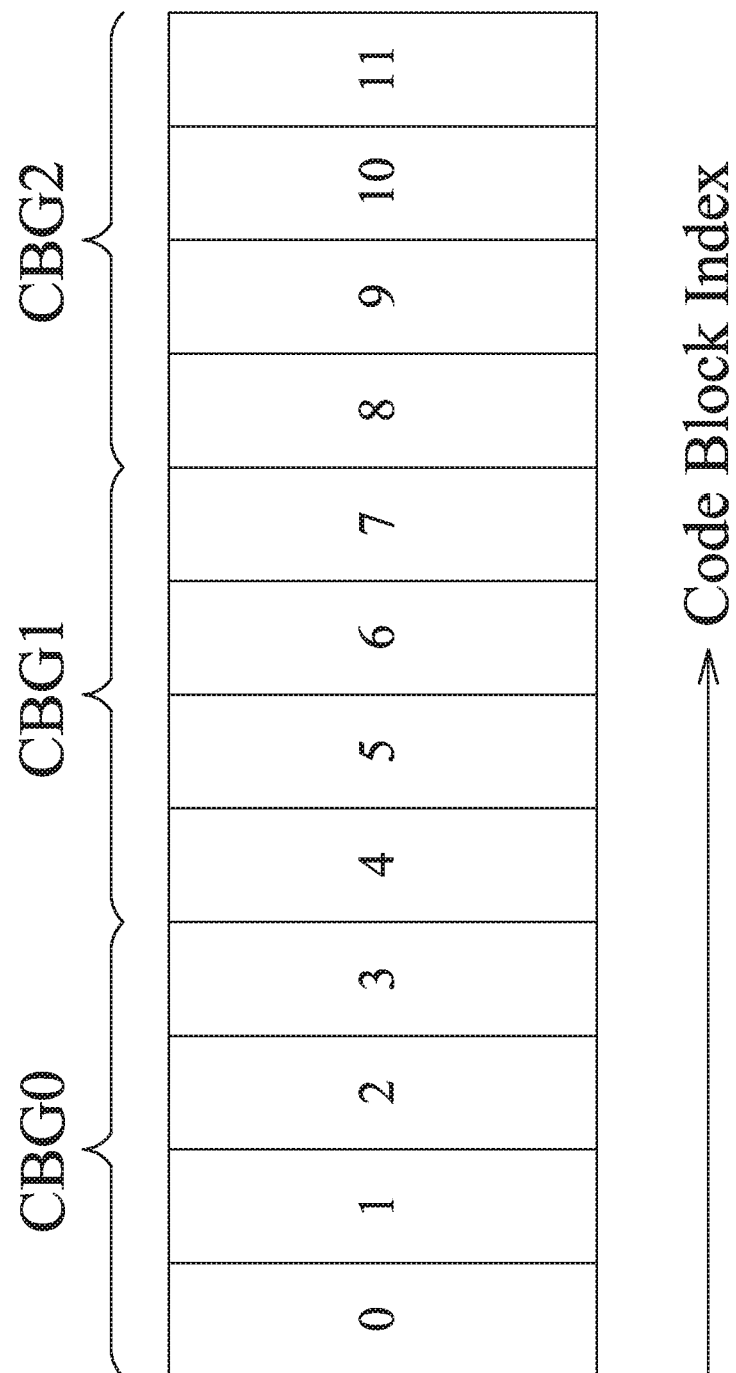
FIG. 13 illustrates CBG based transmission according to one embodiment of this disclosure.

To further improve the data rate for a UE, code block group (CBG) (re)transmission can be employed. As agreed in NR, CBG based transmission and retransmission can be configured for a given UE both for DL data transmission and UL data transmission. In addition, the number of CBGs for a transport block (TB) can be configured for a UE. FIG. 13 illustrates one example of CBG based transmission and retransmission. As shown in FIG. 13, one transport block includes 12 code blocks with code block indices "0" to "11", and a size for bundling HARQ-ACK feedback is 4. In this case, three HARQ-ACK bits are used to indicate whether three CBGs (CBG0, CBG1, CBG2) are successfully decoded, where each CBG contains 4 code blocks.

To enable low latency transmission, multiple separate PUCCH contents can be employed to carry the HARQ-ACK feedback for multiple parts of CBGs, respectively. In this regard, the RAN node configures only one DCI for data scheduling, which can help reduce signaling overhead and thereby improve the data throughput compared to the option with non-slot-based scheduling over blank resources. In one embodiment, the one or more processors of the baseband circuitry of the RAN node configure one DCI for scheduling data transmission of a TB, and divide the TB into a plurality of CBGs. In one embodiment, the one or more processors of the baseband circuitry of the RAN node group the CBGs into a first part of CBGs and a second part of CBGs, and the UE transmits, to the RAN node a first PUCCH content carrying HARQ feedback for the first part of CBGs and a second PUCCH content carrying HARQ feedback for the second part of CBGs.

The RF interface of the baseband circuitry of the UE receives the DCI for scheduling data transmission of the TB and then receives a plurality of CBGs of the TB according to the DCI, and the one or more processors of the baseband circuitry of the UE decode the CBGs and configure uplink control data to carry separate HARQ feedback for the CBGs. In one embodiment, the one or more processors of the baseband circuitry of the UE configure the uplink control data to include multiple bits to respectively indicate whether the CBGs are successfully decoded. In one embodiment, the one or more processors of the baseband circuitry of the UE configure the uplink control data to include a first PUCCH content carrying HARQ feedback for the first part of the CBGs, and a second PUCCH content carrying HARQ feedback for the second part of the CBGs.

Figure 14:
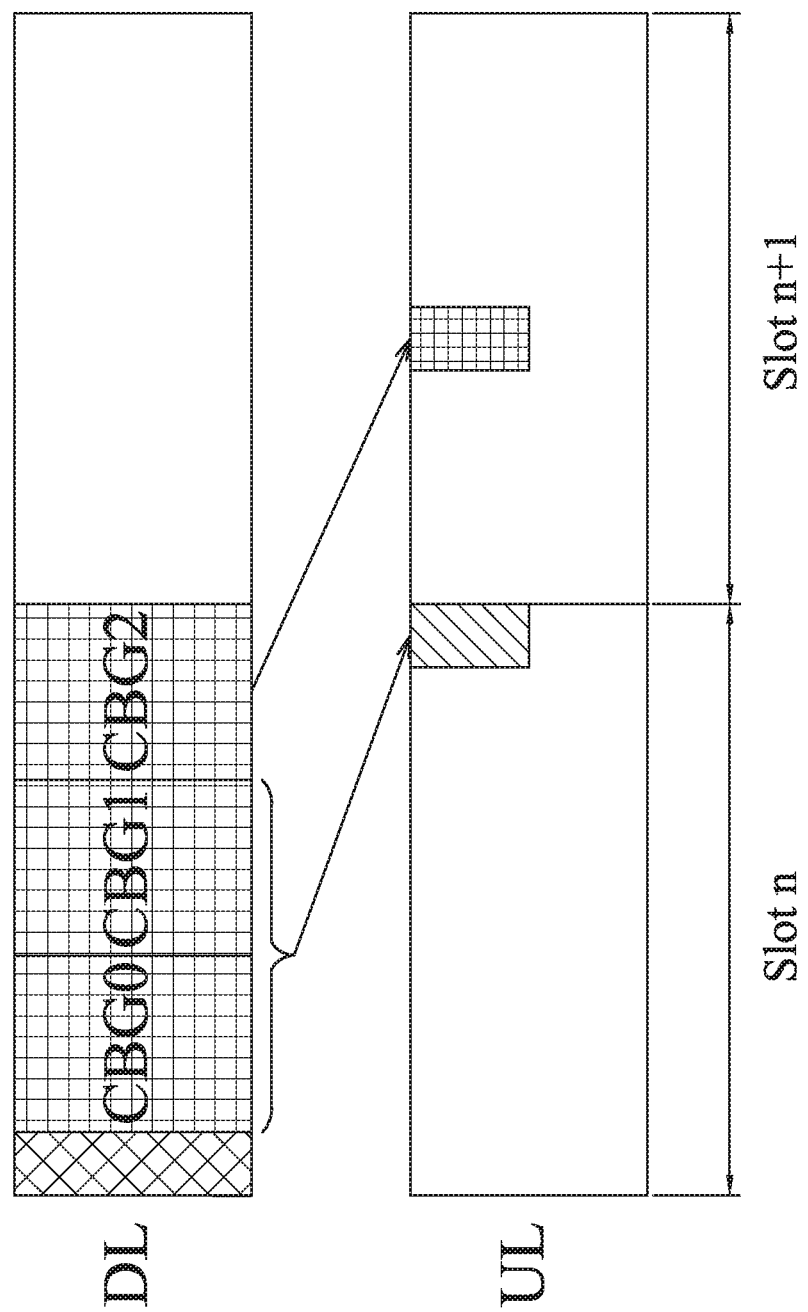
FIG. 14 illustrates CBG based transmission with separate HARQ-ACK feedback according to one embodiment of this disclosure.

FIG. 14 illustrates one example of CBG based transmission with separate HARQ-ACK feedback according to one embodiment. In the example, it is assumed that three CBGs (i.e., CBG0, CBG1, CBG2) are configured by higher layers, and a first part of CBGs includes CBG0 and CBG1 and a second part of CBGs includes CBG2. In this case, a first PUCCH content (PUCCH #1) carries the HARQ-ACK feedback for the first part of CBGs including CBG #0 and CBG #1, and a second PUCCH content (PUCCH #2) carries the HARQ-ACK feedback for the second part of CBGs including CBG #2. It should be noted that a PDCCH content carrying the DCI is configured to schedule PDSCH transmission with the first part of CBGs and the second part of CBGs.

In the specification defined for the NR system, for each code block (CB), a CB-level cyclic redundancy check (CRC) is attached to the CB. In one embodiment, in addition to CB-level CRCs respectively for all CBs, multiple CBG-level CRCs are attached respectively to the multiple parts of CBGs and a TB-level CRC is attached to the TB. In this embodiment, the UE reports a NACK when all CB-level CRCs pass but any CBG-level CRC fails in the corresponding HARQ-ACK feedback report. In another embodiment, only CB-level CRC, with or without introduction of CBG-level CRC, is used for both parts of CBGs.

In some embodiments, the PDSCH transmission can be defined as scheduling of multiple PDSCH contents (multi-PDSCH scheduling) using a single DCI, such that these PDSCH contents follow a common frequency and spatial domain resource allocation and modulation coding scheme (MCS) with possibly different time domain allocations. This configuration may provide functionality similar to CBG-based (re)transmission without necessarily configuring CBG-based (re)transmission. In one embodiment, in addition to the CB-level CRCs, TB-level CRC is present in each of the PDSCH contents, and the UE reports ACK/NACK feedback corresponding to each of the PDSCH contents via the resource for corresponding PUCCH transmission. To support such scheduling assignment, in one embodiment, the DCI includes two separate indications related to the time-domain resource allocation covering the PDSCH contents, respectively. In another embodiment, the DCI indicates the overall time domain resource allocation covering both PDSCH contents, and additionally, a parameter indicating that the end of transmission of the first PDSCH content or start of transmission of the second PDSCH content is present in the DCI when the UE is configured to use multiple-PDSCH scheduling. It should be noted that the above mechanism for multi-PDSCH scheduling can be applied to the multi-PUSCH scheduling shown in FIG. 12. More specifically, one DCI can be used to schedule one TB in PUSCH transmission in slot n and another TB in PUSCH transmission in slot n+1.

In one embodiment, for partitioning of a PDSCH content into two groups of CBGs, the same HARQ process ID is applied to both parts. In this embodiment, retransmission of the individual parts of CBGs can be implemented via CBG-based retransmission such that retransmission of both parts of CBGs is always indicated by the same DCI indicating CBG-based retransmission.

In one embodiment, when a single DCI is configured to schedule multiple PDSCH contents with possibly different durations, different HARQ process IDs are signaled for the scheduled PDSCH contents, respectively. In this embodiment, retransmission of the individual parts of CBGs can be scheduled by separate DCIs. Specifically, when both the first and second parts of CBGs fail, the first part of CBGs and the second part of CBGs may be scheduled for retransmission as either two parts of CBGs (i.e., first and second PDSCH contents) by two separate DCIs or as a single PDSCH content scheduled by a separate DCI.

The partition between the first part of CBGs and the second part of CBGs can be predefined in the specification for the NR system or may be configured by higher layers via NR minimum system information (MSI), NR remaining minimum system information (RMSI), NR other system information (OSI), or radio resource control (RRC) signaling, or dynamically indicated in the scheduling or a separate DCI or a combination thereof. Alternatively, the partition between the first part of CBGs and the second part of CBGs can be determined in accordance with the configured number of CBGs.

Given that one DCI is used to schedule the CBG based transmission, embodiments of resource allocation for the transmission of the first and second PUCCH contents are provided as follows.

In one embodiment, resource allocation for the transmission of the first and second PUCCH contents is explicitly and independently indicated in the same DCI. More specifically, a set of resources in time, frequency and/or code domain can be configured by higher layers, and two independent fields in the DCI can be used to indicate which resource from the set of configured resources is to be used for the transmission of the first and second PUCCH contents. The one or more processors of the baseband circuitry of the RAN node configure the DCI to indicate resource allocation for transmission of the first PUCCH content and the second PUCCH content.

In one embodiment, resource allocation for the transmission of the first PUCCH content is explicitly indicated in the DCI, and the resource allocation for the transmission of the second PUCCH content may be implicit and derivable from the resource allocation for the first PUCCH content. It should be noted that a set of resources in time, frequency and/or code domain can be configured by higher layers, and one field in the DCI can be used to indicate which resource from the set of configured resources is to be used for the transmission of the first PUCCH content. The one or more processors of the baseband circuitry of the UE allocate resource for transmission of the first PUCCH content according to the DCI, and derive resource allocation for transmission of the second PUCCH content from resource allocation for the first PUCCH content.

In one embodiment, one field in the DCI is used to indicate the resource in frequency and/or code domain from a set of resources which are configured by higher layers for the transmission of the first PUCCH content. Further, same resource in frequency and/or code domain for the transmission of the first PUCCH content can be used for the transmission of the second PUCCH content.

For time domain resource, the HARQ-ACK delay for the transmission of the first PUCCH content is indicated in the DCI, and the HARQ-ACK delay for the transmission of the second PUCCH content can be derived from the HARQ-ACK delay for the first PUCCH content or explicitly indicated in the DCI. In one embodiment, there is a K-symbol delay between the transmission of the first PUCCH content and the transmission of the second PUCCH content, where K can be predefined in the specification for the NR system or configured by higher layers via MSI, RMSI, OSI or RRC signaling. In another embodiment, the delay between the transmission of the first PUCCH content and the transmission of the second PUCCH content is defined as a function of the duration of the second part of the PDSCH content.

It should be noted that the above mechanism can be straightforwardly extended for UL data transmission, where CBG based (re)transmission and multi-PUSCH scheduling can be employed to fill in the gap (blank resource) at the beginning of a slot.

Figure 15:
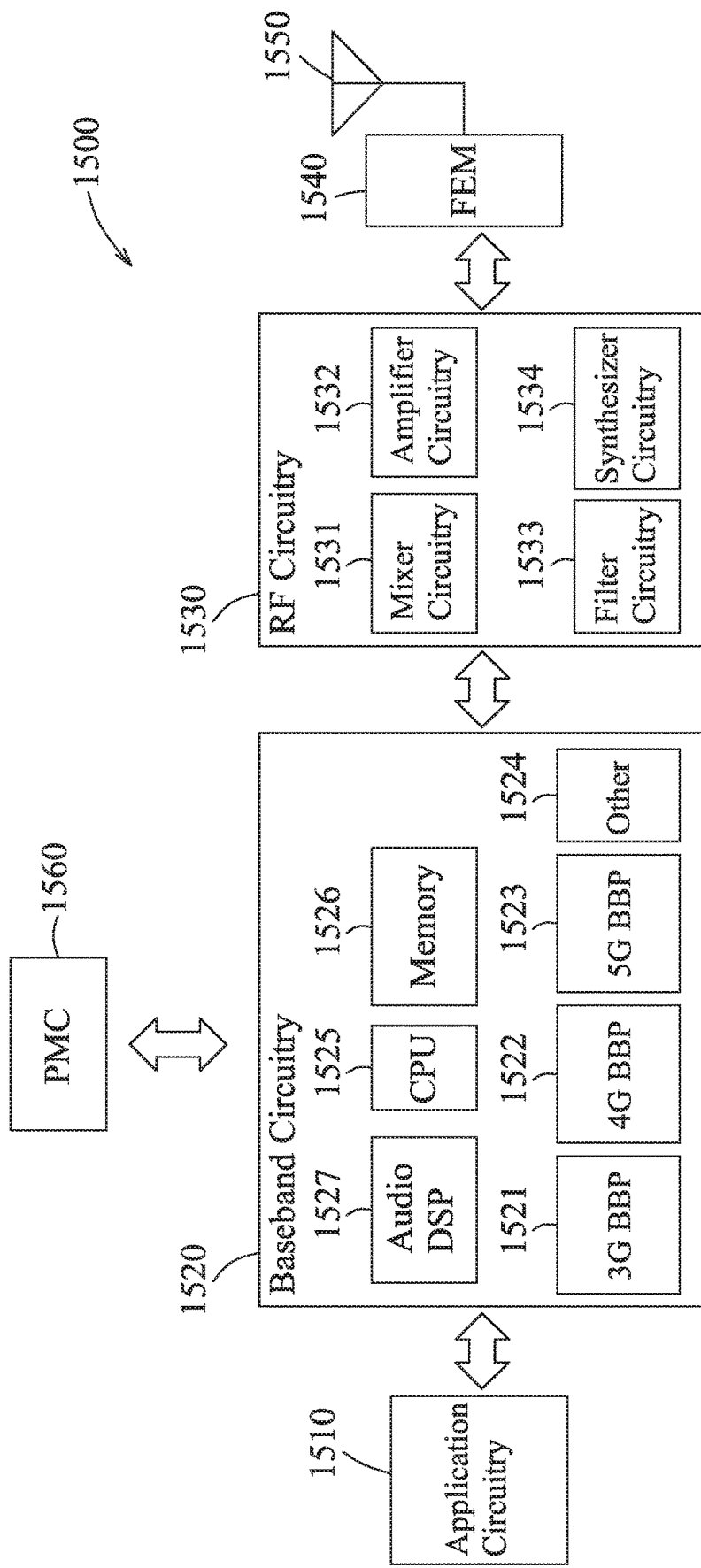
FIG. 15 is a schematic block diagram illustrating an apparatus for ultra-reliable and low-latency communication according to some embodiments of this disclosure.

FIG. 15 illustrates an example of an apparatus 1500 operable for ultra-reliable and low-latency communication according to some embodiments of this disclosure. For example, the apparatus 1500 may be included in a user equipment (UE) or a radio access network (RAN) node. In this embodiment, the apparatus 1500 includes application circuitry 1510, baseband circuitry 1520, radio frequency (RF) circuitry 1530, front-end module (FEM) circuitry 1540, one or more antennas 1550 (only one is depicted) and power management circuitry (PMC) 1560. In some embodiments, the apparatus 1500 may include fewer components. For example, a RAN node may not include the application circuitry 1510, and instead include a processor/controller to process Internet-Protocol (IP) data received from an evolved packet core (EPC) network. In other embodiments, the apparatus 1500 may include additional components, for example, a memory/storage device, a display, a camera, a sensor or an input/output (I/O) interface. In some embodiments, the above-mentioned components may be included in more than one device. For example, in order to implement a Cloud-RAN architecture, the above-mentioned circuitries may be separated and included in two or more devices in the Cloud-RAN architecture.

The application circuitry 1510 may include one or more application processors. For example, the application circuitry 1510 may include, but is not limited to, one or more single-core or multi-core processors. The processors may include any combination of general-purpose processors and dedicated processors (e.g., graphics processors, application processors, etc.). The processors may be coupled to or include a memory/storage module, and may be configured to execute instructions stored in the memory/storage module to enable various applications or operating systems to run on the apparatus 1500. In some embodiments, the processors of the application circuitry 1510 may process IP data packets received from an EPC network.

In some embodiments, the baseband circuitry 1520 may provide for communication compatible with one or more radio technologies. For example, in some embodiments, the baseband circuitry 1520 may support communication with an evolved universal terrestrial radio access network (EUTRAN) or other wireless metropolitan area networks (WMAN), a wireless local area network (WLAN), or a wireless personal area network (WPAN). In some embodiments where the baseband circuitry 1520 is configured to support radio communication using more than one wireless protocol, the baseband circuitry 1520 may be referred to as a multi-mode baseband circuitry.

The baseband circuitry 1520 may include, but is not limited to, one or more single-core or multi-core processors. The baseband circuitry 1520 may include one or more baseband processors or control logic to process baseband signals received from the RF circuitry 1530, and to generate baseband signals to be transmitted to the RF circuitry 1530. The baseband circuitry 1520 may interface and communicate with the application circuitry 1510 for generation and processing of the baseband signals and for controlling operations of the RF circuitry 1530.

In some embodiments, the baseband circuitry 1520 may include a third generation (3G) baseband processor (3G BBP) 1521, a fourth generation (4G) baseband processor (4G BBP) 1522, a fifth generation (5G) baseband processor (5G BBP) 1523 and other baseband processor(s) 1524 for other existing generations, generations in development or to be developed in the future (e.g., second generation (2G), sixth generation (6G), etc.). The baseband processors 1521-1524 of the baseband circuitry 1520 are configured to handle various radio control functions that enable communication with one or more radio networks via the RF circuitry 1530. In other embodiments, the baseband circuitry 1520 may further include a central processing unit (CPU) 1525 and a memory 1526, and some or all functionality (e.g., the radio control functions) of the baseband processors 1521-1524 may be implemented as software modules that are stored in the memory 1526 and executed by the CPU 1525 to carry out the functionality. The radio control functions of the baseband processors 1521-1524 may include, but are not limited to, signal modulation/demodulation, encoding/decoding, radio frequency shifting, etc. In some embodiments, the signal modulation/demodulation includes Fast-Fourier Transform (FFT), pre-coding or constellation mapping/demapping. In some embodiments, the encoding/decoding includes convolution, tail-biting convolution, turbo, Viterbi, or Low Density Parity Check (LDPC) encoding/decoding. Embodiments of the signal modulation/demodulation and the encoding/decoding are not limited to these examples and may include other suitable operations in other embodiments. In some embodiments, the baseband circuitry 1520 may further include an audio digital signal processor (DSP) 1527 for compression/decompression and echo cancellation.

In some embodiments, the components of the baseband circuitry 1520 may be integrated as a single chip or a single chipset, or may be disposed on a single circuit board. In some embodiments, some or all of the constituent components of the baseband circuitry 1520 and the application circuitry 1510 may be integrated as, for example, a system on chip (SoC).

The RF circuitry 1530 is configured to enable communication with wireless networks using modulated electromagnetic radiation through a non-solid medium. In various embodiments, the RF circuitry 1530 may include switches, filters, amplifiers, etc., to facilitate communication with the wireless network. The RF circuitry 1530 may include a receive signal path that includes circuitry to down-convert RF signals received from the FEM circuitry 1540 and to provide the baseband signals to the baseband circuitry 1520. The RF circuitry 1530 may further include a transmit signal path that includes circuitry to up-convert the baseband signals provided by the baseband circuitry 1520 and to provide RF output signals to the FEM circuitry 1540 for transmission.

In some embodiments, the receive signal path of the RF circuitry 1530 may include mixer circuitry 1531, amplifier circuitry 1532 and filter circuitry 1533. In some embodiments, the transmit signal path of the RF circuitry 1530 may include filter circuitry 1533 and mixer circuitry 1531. The RF circuitry 1530 may also include synthesizer circuitry 1534 for synthesizing a frequency for use by the mixer circuitry 1531 of the receive signal path and/or the transmit signal path.

For the receive signal path, in some embodiments, the mixer circuitry 1531 may be configured to down-convert RF signals received from the FEM circuitry 1540 based on the synthesized frequency provided by synthesizer circuitry 1534. The amplifier circuitry 1532 may be configured to amplify the down-converted signals. The filter circuitry 1533 may be a low-pass filter (LPF) or a band-pass filter (BPF) configured to remove unwanted signals from the down-converted signals to generate output baseband signals. The output baseband signals may be provided to the baseband circuitry 1520 for further processing. In some embodiments, the output baseband signals may be zero-frequency baseband signals, although this is not a requirement. In some embodiments, the mixer circuitry 1531 of the receive signal path may include passive mixers, although the scope of the embodiments is not limited in this respect.

As for the transmit signal path, in some embodiments, the mixer circuitry 1531 may be configured to up-convert input baseband signals based on the synthesized frequency provided by the synthesizer circuitry 1534 to generate the RF output signals for the FEM circuitry 1540. The input baseband signals may be provided by the baseband circuitry 1520, and may be filtered by the filter circuitry 1533.

In some embodiments, the mixer circuitry 1531 of the receive signal path and the mixer circuitry 1531 of the transmit signal path may include two or more mixers and may be arranged for quadrature down-conversion in the receive signal path and for quadrature up-conversion in the transmit signal path. In some embodiments, the mixer circuitry 1531 of the receive signal path and the mixer circuitry 1531 of the transmit signal path may include two or more mixers and may be arranged for image rejection (e.g., Hartley image rejection). In some embodiments, the mixer circuitry 1531 of the receive signal path and the mixer circuitry 1531 of the transmit signal path may be arranged for direct down-conversion and direct up-conversion, respectively. In some embodiments, the mixer circuitry 1531 of the receive signal path and the mixer circuitry 1531 of the transmit signal path may be configured for super-heterodyne operation.

In some embodiments, the output baseband signals and the input baseband signals may be analog baseband signals, although the scope of the embodiments is not limited in this respect. In alternative embodiments, the output baseband signals and the input baseband signals may be digital baseband signals. In such alternative embodiments, the RF circuitry 1530 may further include analog-to-digital converter (ADC) circuitry and digital-to-analog converter (DAC) circuitry, and the baseband circuitry 1520 may include a digital baseband interface to communicate with the RF circuitry 1530.

In some dual-mode embodiments, a separate radio IC circuitry may be provided for processing signals for each spectrum, although the scope of the embodiments is not limited in this respect.

In some embodiments, the synthesizer circuitry 1534 may be a fractional-N synthesizer or a fractional N/N+1 synthesizer, although the scope of the embodiments is not limited in this respect as other types of frequency synthesizers may be suitable. For example, the synthesizer circuitry 1534 may be a delta-sigma synthesizer, a frequency multiplier, or a synthesizer comprising a phase-locked loop with a frequency divider in other embodiments.

The synthesizer circuitry 1534 may be configured to synthesize an output frequency for use by the mixer circuitry 1531 of the RF circuitry 1530 based on a frequency input and a divider control input. In some embodiments, the frequency input may be provided by a voltage controlled oscillator (VCO), although that is not a requirement. In some embodiments, the divider control input may be provided by either the baseband circuitry 1520 or the application circuitry 1510 depending on the desired output frequency. In some embodiments, the divider control input (e.g., N) may be determined according to a look-up table based on a channel indicated by the application circuitry 1510.

The synthesizer circuitry 1534 of the RF circuitry 1530 may include a divider, a delay-locked loop (DLL), a multiplexer and a phase accumulator. In some embodiments, the divider may be a dual modulus divider (DMD), and the phase accumulator may be a digital phase accumulator (DPA). In some embodiments, the DMD may be configured to divide an input signal by either N or N+1 (e.g., based on a carry out) to provide a fractional division ratio. In some embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is a number of the delay elements in the delay line. In this way, the DLL provides negative feedback to help ensure that the total delay through the delay line is one VCO cycle.

In some embodiments, the synthesizer circuitry 1534 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1530 may include an IQ/polar converter.

The FEM circuitry 1540 may include a receive signal path that includes circuitry configured to operate on RF signals received from the one or more antennas 1550, to amplify the received RF signals and to provide amplified versions of the received RF signals to the RF circuitry 1530 for further processing. The FEM circuitry 1540 may further include a transmit signal path that includes circuitry configured to amplify signals provided by the RF circuitry 1530 for transmission by one or more of the one or more antennas 1550. In various embodiments, the amplification through the transmit or receive signal path may be done solely in the RF circuitry 1530, solely in the FEM circuitry 1540, or in both the RF circuitry 1530 and the FEM circuitry 1540.

In some embodiments, the FEM circuitry 1540 may include a TX/RX switch to switch between transmit mode operation and receive mode operation. The receive signal path of the FEM circuitry 1540 may include a low-noise amplifier (LNA) to amplify the received RF signals and to provide the amplified versions of the received RF signals as an output (e.g., to the RF circuitry 1530). The transmit signal path of the FEM circuitry 1540 may include a power amplifier (PA) to amplify input RF signals (e.g., provided by the RF circuitry 1530), and one or more filters to generate RF signals for subsequent transmission (e.g., by one or more of the one or more antennas 1550).

In some embodiments, the PMC 1560 is configured to manage power provided to the baseband circuitry 1520. In particular, the PMC 1560 may control power-source selection, voltage scaling, battery charging, or DC-to-DC conversion. The PMC 1560 may often be included in the apparatus 1500 when the apparatus 1500 is capable of being powered by a battery. For example, when the apparatus 1500 is included in a UE, it generally includes the PMC 1560. The PMC 1560 may increase the power conversion efficiency while providing desirable implementation size and heat dissipation characteristics.

While FIG. 15 shows the PMC 1560 being coupled only with the baseband circuitry 1520, in other embodiments, the PMC 1560 may be additionally or alternatively coupled with, and perform similar power management operations for, other components such as, but not limited to, the application circuitry 1510, the RF circuitry 1530 or the FEM 1540.

In some embodiments, the PMC 1560 may control, or otherwise be part of, various power saving mechanisms of the apparatus 1500. For example, if the apparatus 1500 is in an RRC_Connected state, where it is still connected to the RAN node as it expects to receive traffic shortly, then it may enter a state known as Discontinuous Reception Mode (DRX) after a period of inactivity. During this state, the apparatus 1500 may power down for brief intervals of time and thus save power.

If there is no data traffic activity for an extended period of time, then the apparatus 1500 may enter an RRC_Idle state, where it disconnects from network and does not perform operations such as channel quality feedback, handover, etc. The apparatus 1500 goes into a very low power state and it performs paging where it periodically wakes up to listen to the network and then powers down again. The apparatus 1500 may not receive data in this state. In order to receive data, the apparatus 1500 transitions back to the RRC_Connected state.

An additional power saving mode may allow a device or apparatus to be unavailable to the network for periods longer than a paging interval (ranging from seconds to a few hours). During this time, the device or apparatus is totally unreachable to the network and may power down completely. Any data sent during this time incurs a large delay and it is assumed the delay is acceptable.

Processors of the application circuitry 1510 and processors of the baseband circuitry 1520 may be used to execute elements of one or more instances of a protocol stack. For example, processors of the baseband circuitry 1520, alone or in combination, may be used to execute Layer 3, Layer 2, or Layer 1 functionality, while processors of the application circuitry 1510 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 16:
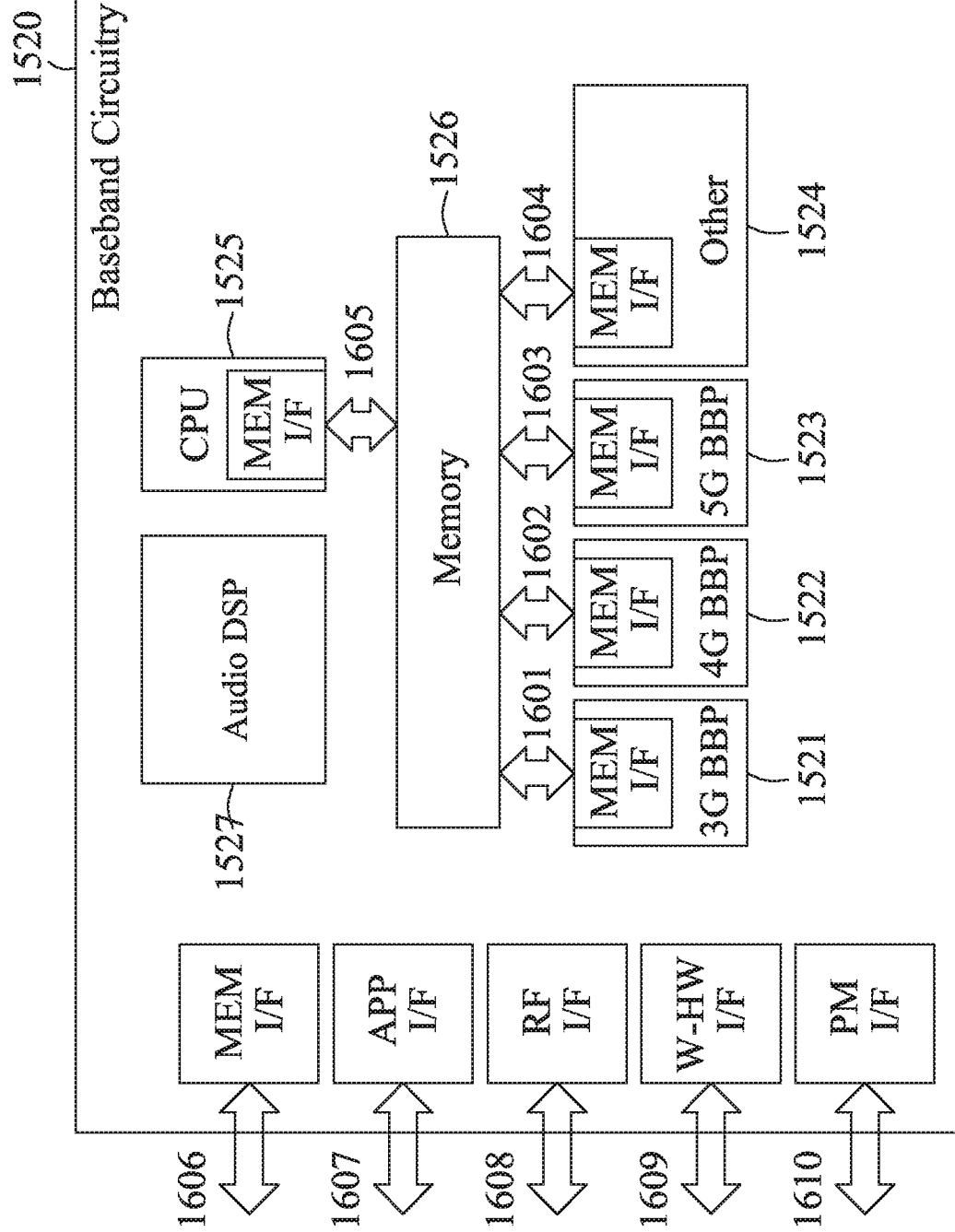
FIG. 16 illustrates example interfaces of baseband circuitry according to some embodiments of this disclosure.

FIG. 16 illustrates example interfaces of baseband circuitry in accordance with some embodiments. As discussed above, the baseband circuitry 1520 of FIG. 15 includes various processors (i.e., the baseband processors 1521-1524 and the CPU 1525), and the memory 1526 utilized by the processors. Each of the processors 1521-1525 may include an internal memory interface (MEM I/F) 1601-1605 communicatively coupled to the memory 1526 so as to send/receive data to/from the memory 1526.

The baseband circuitry 1520 may further include one or more interfaces to communicatively couple to other circuitries/devices. The one or more interfaces include, for example, a memory interface (MEM I/F) 1606 (e.g., an interface to send/receive data to/from memory external to the baseband circuitry 1520), an application circuitry interface (APP I/F) 1607 (e.g., an interface to send/receive data to/from the application circuitry 1510 of FIG. 15), an RF circuitry interface (RF I/F) 1608 (e.g., an interface to send/receive data to/from the RF circuitry 1530 of FIG. 15), a wireless hardware connectivity interface (W-HW I/F) 1609 (e.g., an interface to send/receive data to/from Near Field Communication (NFC) components, Bluetooth® components (e.g., Bluetooth® Low Energy), Wi-Fi® components, and/or other communication components), and a power management interface (PM I/F) 1610 (e.g., an interface to send/receive power or control signals to/from the PMC 1560 of FIG. 15).

Figure 17:
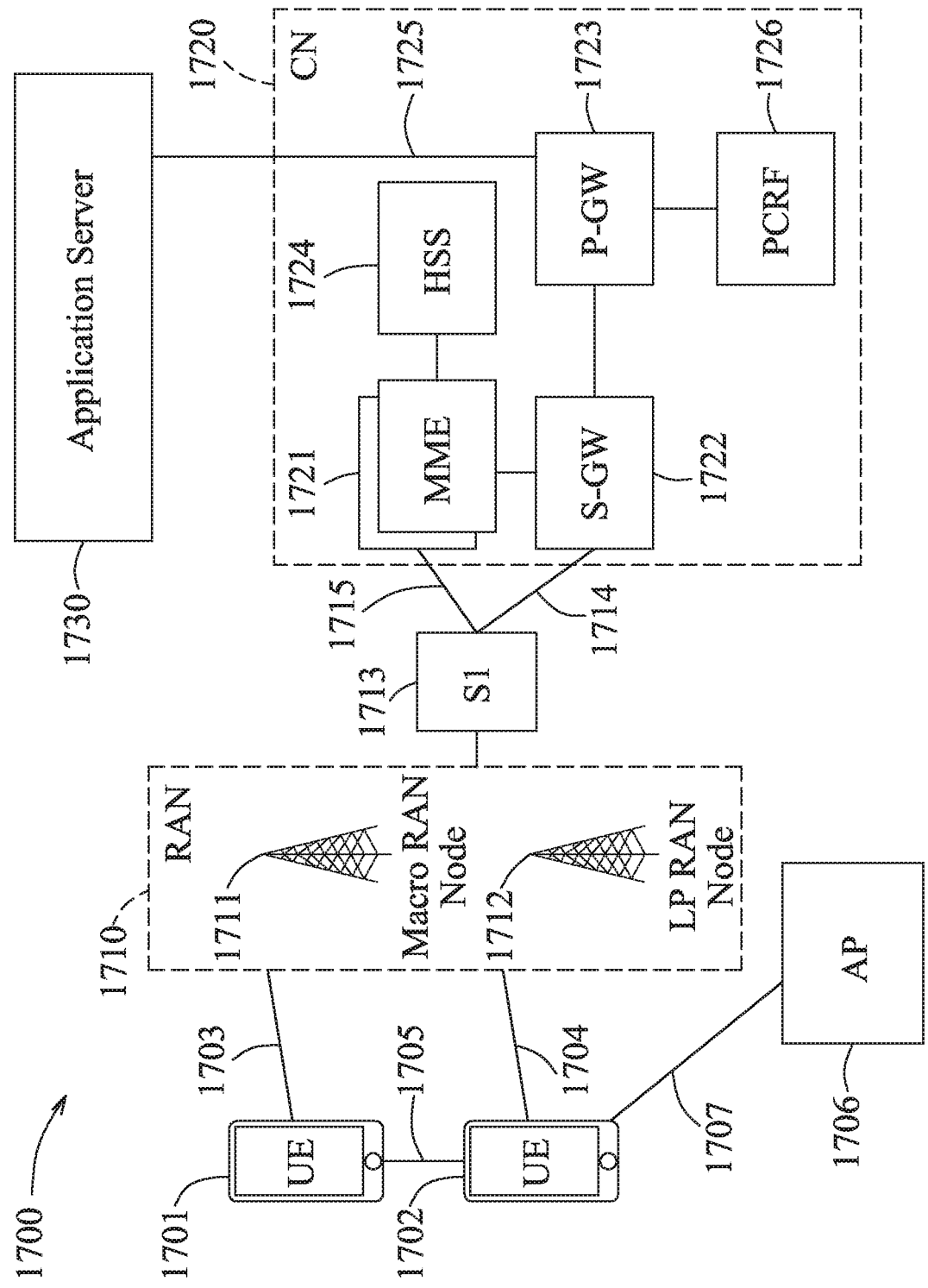
FIG. 17 illustrates an architecture of a system of a network according to some embodiments of this disclosure.

FIG. 17 illustrates an architecture of a system 1700 of a network in accordance with some embodiments of this disclosure. The system 1700 is shown to include a user equipment (UE) 1701 and a UE 1702. The UEs 1701 and 1702 are illustrated as smartphones (e.g., handheld touch-screen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, at least one of the UEs 1701 and 1702 may be an Internet-of-Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UE may execute background applications (e.g., keep-alive messages, status updates, etc.) to facilitate the connections of the IoT network.

The UEs 1701 and 1702 may be configured to connect, e.g., communicatively couple, with a radio access network (RAN) 1710. The RAN 1710 may be, for example, an Evolved Universal Mobile Telecommunications System (UMTS) Terrestrial Radio Access Network (E-UTRAN), a NextGen RAN (NG RAN), or some other type of RAN. The UEs 1701 and 1702 utilize connections 1703 and 1704, respectively. Each of the connections 1703 and 1704 includes a physical communications interface or layer (discussed in further detail below). In this embodiment, the connections 1703 and 1704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1701 and 1702 may further directly exchange communication data via a ProSe interface 1705. The ProSe interface 1705 may alternatively be referred to as a sidelink interface including one or more logical channels. The one or more logical channels include, but are not limited to, a Physical Sidelink Control Channel (PSCCH), a Physical Sidelink Shared Channel (PSSCH), a Physical Sidelink Discovery Channel (PSDCH) and a Physical Sidelink Broadcast Channel (PSBCH).

The UE 1702 is shown to be configured to access an access point (AP) 1706 via connection 1707. The connection 1707 may include a local wireless connection, such as a connection consistent with any IEEE 802.11 protocol, wherein the AP 1706 may include a wireless fidelity (WiFi®) router. In this example, the AP 1706 is shown to be connected to the Internet without connecting to a core network 1720 of the wireless system 1700 (described in further detail below).

The RAN 1710 can include one or more access nodes that enable the connections 1703 and 1704. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). In some embodiments, the RAN 1710 may include one or more RAN nodes for providing macrocells, e.g., macro RAN node 1711, and one or more RAN nodes for providing femtocells or picocells (e.g., cells having smaller coverage areas, smaller user capacity, or higher bandwidth compared to macrocells), e.g., low power (LP) RAN node 1712.

Any one of the RAN nodes 1711 and 1712 can terminate the air interface protocol and can be the first point of contact for the UEs 1701 and 1702. In some embodiments, any one of the RAN nodes 1711 and 1712 can fulfill various logical functions for the RAN 1710 including, but not limited to, radio network controller (RNC) functions such as radio bearer management, uplink and downlink dynamic radio resource management and data packet scheduling, and mobility management.

According to some embodiments, the UEs 1701 and 1702 can be configured to communicate using Orthogonal Frequency-Division Multiplexing (OFDM) communication signals with each other or with any of the RAN nodes 1711 and 1712 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications). It is noted that the scope of the embodiments is not limited in this respect. The OFDM signals may include a plurality of orthogonal subcarriers.

In some embodiments, a downlink resource grid can be used for downlink transmissions from any one of the RAN nodes 1711 and 1712 to the UEs 1701 and 1702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that can currently be allocated. There are several different physical downlink channels that are conveyed using such resource blocks.

The PDSCH may carry user data and higher-layer signaling to the UEs 1701 and 1702. The PDCCH may carry information about the transport format and resource allocations related to the PDSCH, among other things. The PDCCH may also inform the UEs 1701 and 1702 about the transport format, resource allocation, and H-ARQ (Hybrid Automatic Repeat Request) information related to the uplink shared channel. Typically, downlink scheduling (assigning control and shared channel resource blocks to a UE within a cell) may be performed at any of the RAN nodes 1711 and 1712 based on channel quality information fed back from any one of the UEs 1701 and 1702. The downlink resource assignment information may be sent on the PDCCH used for (e.g., assigned to) each of the UEs 1701 and 1702.

The PDCCH may use control channel elements (CCEs) to convey the control information. Before being mapped to resource elements, PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as enhanced resource element groups (EREGs). One of the ECCEs may have other numbers of EREGs in some situations.

The RAN 1710 is shown to be communicatively coupled to the core network (CN) 1720 via an S1 interface 1713. In some embodiments, the CN 1720 may be an evolved packet core (EPC) network, a NextGen Packet Core (NPC) network, or some other type of CN. In this embodiment the S1 interface 1713 is split into two parts, including an S1-U interface 1714 and an S1-mobility management entity (MME) interface 1715. The S1-U interface 1714 carries traffic data between the RAN nodes 1711 and 1712 and a serving gateway (S-GW) 1722. The S1-MME interface 1715 is a signaling interface between the RAN nodes 1711 and 1712 and MMEs 1721.

In this embodiment, the CN 1720 includes the MMEs 1721, the S-GW 1722, a Packet Data Network (PDN) Gateway (P-GW) 1723, and a home subscriber server (HSS) 1724. The MMEs 1721 may be similar in function to the control plane of legacy Serving General Packet Radio Service (GPRS) Support Nodes (SGSN). The MMEs 1721 may manage mobility aspects in access such as gateway selection and tracking area list management. The HSS 1724 may include a database for network users, including subscription-related information to support the network entities' handling of communication sessions. The CN 1720 may include one or several HSSs 1724, depending on the number of mobile subscribers, on the capacity of the equipment, on the organization of the network, etc. For example, the HSS 1724 can provide support for routing/roaming, authentication, authorization, naming/addressing resolution, location dependencies, etc.

The S-GW 1722 terminates the S1 interface 1713 towards the RAN 1710, and routes data packets between the RAN 1710 and the CN 1720. In addition, the S-GW 1722 may be a local mobility anchor point for inter-RAN node handovers, and also may provide an anchor for inter-3GPP mobility. Other responsibilities of the S-GW 1722 may include lawful intercept, charging, and some policy enforcement.

The P-GW 1723 terminates an SGi interface toward a PDN. The P-GW 1723 routes data packets between the CN 1720 (e.g., the EPC network) and external networks such as a network including an application server 1730 (alternatively referred to as application function (AF)) via an Internet Protocol (IP) interface 1725. Generally, the application server 1730 may be an element offering applications that use IP bearer resources with the core network 1720 (e.g., UMTS Packet Services (PS) domain, LTE PS data services, etc.). In this embodiment, the P-GW 1723 is shown to be communicatively coupled to the application server 1730 via the IP interface 1725. The application server 1730 can also be configured to support one or more communication services (e.g., Voice-over-Internet Protocol (VoIP) sessions, PTT sessions, group communication sessions, social networking services, etc.) for the UEs 1701 and 1702 via the CN 1720.

In some embodiments, the P-GW 1723 may further be a node for policy enforcement and charging data collection. The CN 1720 may further include a policy and charging control element (e.g., Policy and Charging Enforcement Function (PCRF) 1726). In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1726 may be communicatively coupled to the application server 1730 via the P-GW 1723. The application server 1730 may signal the PCRF 1726 to indicate a new service flow and select appropriate Quality of Service (QoS) and charging parameters. The PCRF 1726 may provision this rule into a Policy and Charging Enforcement Function (PCEF) (not shown) with appropriate traffic flow template (TFT) and QoS class of identifier (QCI), which commences the QoS and charging as specified by the application server 1730.

Figure 18:
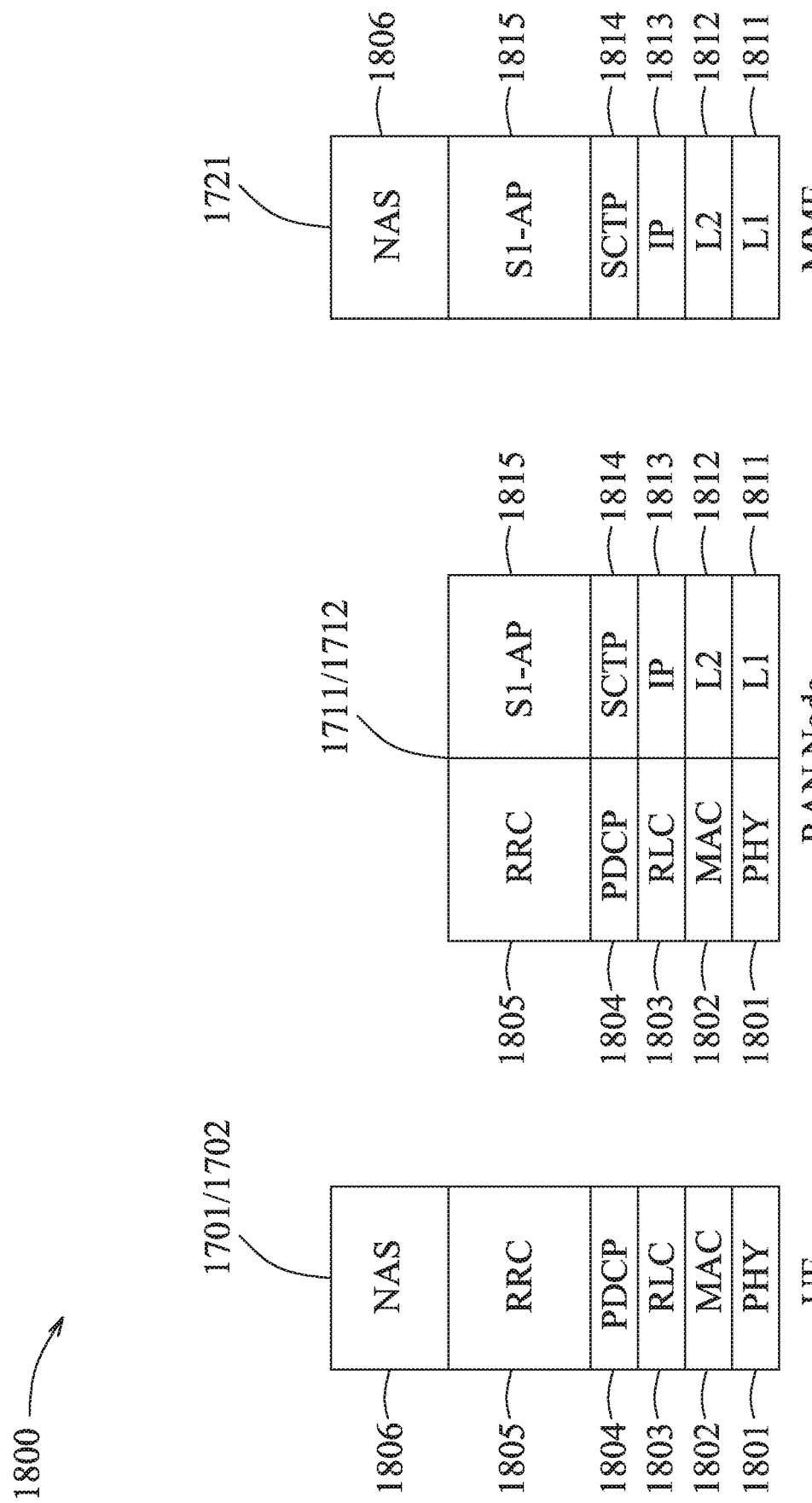
FIG. 18 illustrates an example of a control plane protocol stack according to some embodiments of this disclosure.

FIG. 18 illustrates an example of a control plane protocol stack according to some embodiments of this disclosure. In the example of FIG. 18, a control plane 1800 is shown as a communications protocol stack between the UE 1701 (or alternatively, the UE 1702), the RAN node 1711 (or alternatively, the RAN node 1712), and the MME 1721.

The PHY layer 1801 may transmit or receive information used by the MAC layer 1802 over one or more air interfaces. The PHY layer 1801 may further perform link adaptation or adaptive modulation and coding (AMC), power control, cell search (e.g., for initial synchronization and handover purposes), and other measurements used by higher layers, such as the RRC layer 1805. The PHY layer 1801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1802 may perform mapping between logical channels and transport channels, multiplexing of MAC service data units (SDUs) from one or more logical channels onto transport blocks (TB) to be delivered to the PHY layer 1801 via transport channels, de-multiplexing MAC SDUs to one or more logical channels from transport blocks (TB) delivered from the PHY layer 1801 via transport channels, multiplexing MAC SDUs onto TBs, scheduling information reporting, error correction through hybrid automatic repeat request (HARQ), and logical channel prioritization.

The RLC layer 1803 may operate in a plurality of modes of operation, including Transparent Mode (TM), Unacknowledged Mode (UM) and Acknowledged Mode (AM). The RLC layer 1803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE 1701 or 1702 and the E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may include one or more information elements (IEs), which may each comprise individual data fields or data structures.

The UE 1701 and the RAN node 1711 of FIG. 17 may utilize a Uu interface (e.g., an LTE-Uu interface) to exchange control plane data via a protocol stack including the PHY layer 1801, the MAC layer 1802, the RLC layer 1803, the PDCP layer 1804 and the RRC layer 1805.

The non-access stratum (NAS) protocols 1806 form the highest stratum of the control plane between the UE 1701 or 1702 and the MME 1721. The NAS protocols 1806 support the mobility of the UE 1701 or 1702 and the session management procedures to establish and maintain IP connectivity between the UE 1701 or 1702 and the P-GW 1723 (see FIG. 17).

The S1 Application Protocol (S1-AP) layer 1815 may support the functions of the S1 interface, and include Elementary Procedures (EPs). An EP is a unit of interaction between the RAN node 1711 or 1712 and the CN 1720 (see FIG. 17). The S1-AP layer 1815 provides services that may include two groups, i.e., UE-associated services and non UE-associated services. These services perform functions including, but not limited to, E-UTRAN Radio Access Bearer (E-RAB) management, UE capability indication, mobility, NAS signaling transport, RAN Information Management (RIM), and configuration transfer.

A Stream Control Transmission Protocol (SCTP) layer 1814 may ensure reliable delivery of signaling messages between the RAN node 1711 or 1712 and the MME 1721 based, in part, on the IP protocol supported by the IP layer 1813. An L2 layer 1812 and an L1 layer 1811 may refer to communication links (e.g., wired or wireless) used by the RAN node 1711 or 1712 and the MME 1721 to exchange information.

The RAN node 1711 and the MME 1721 may utilize an S1-MME interface to exchange control plane data via a protocol stack including the L1 layer 1811, the L2 layer 1812, the IP layer 1813, the SCTP layer 1814, and the S1-AP layer 1815.

Figure 19:
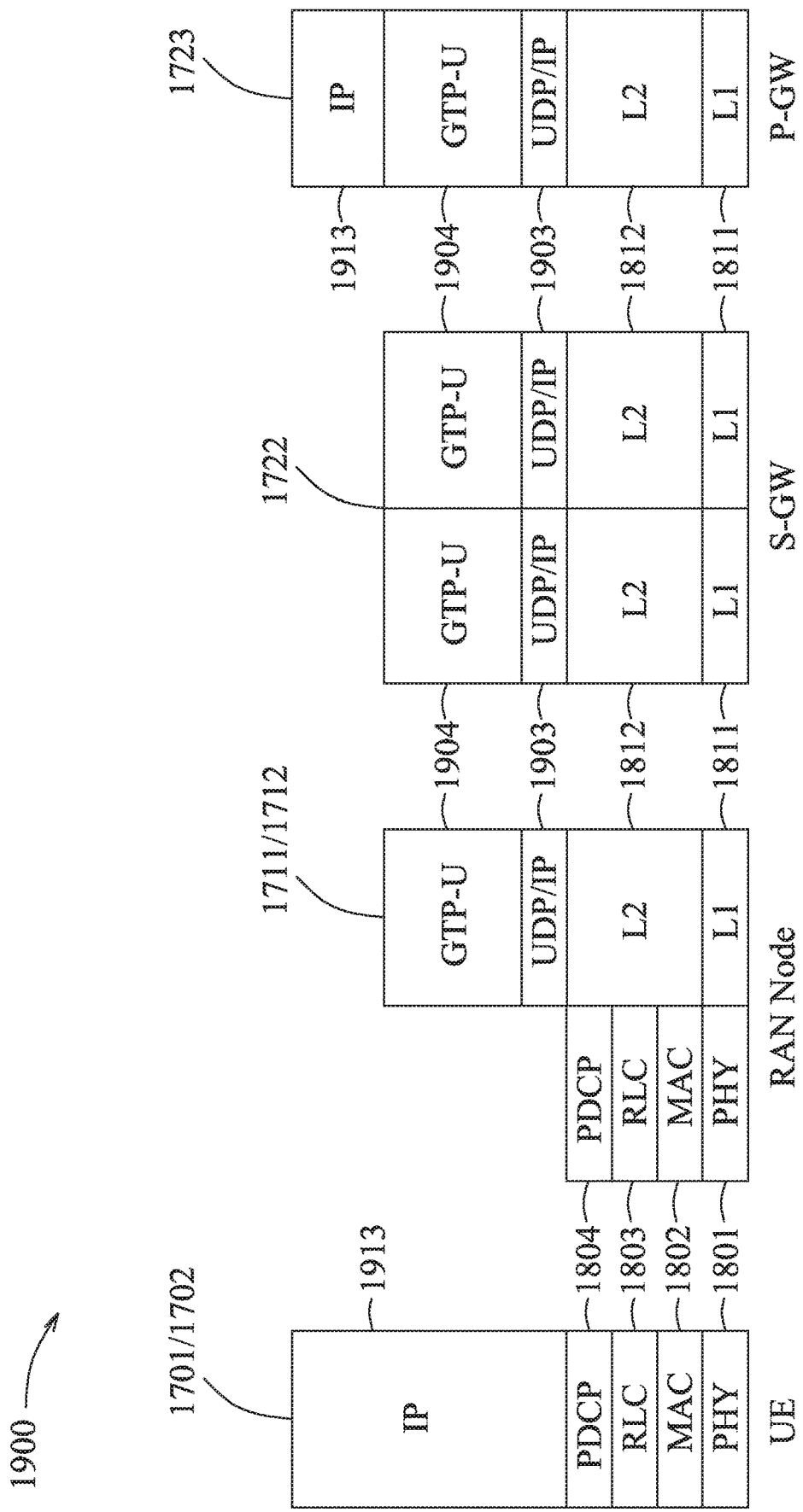
FIG. 19 illustrates an example of a user plane protocol stack according to some embodiments of this disclosure.

FIG. 19 illustrates an example of a user plane protocol stack according to some embodiments of this disclosure. In this example, a user plane 1900 is shown as a communications protocol stack between the UE 1701 (or alternatively, the UE 1702), the RAN node 1711 (or alternatively, the RAN node 1712), the S-GW 1722, and the P-GW 1723. The user plane 1900 may utilize at least some of the same protocol layers as the control plane 1800 of FIG. 18. For example, the UE 1701 or 1702 and the RAN node 1711 or 1712 may utilize a Uu interface (e.g., an LTE-Uu interface) to exchange user plane data via a protocol stack also including a PHY layer 1801, a MAC layer 1802, an RLC layer 1803 and a PDCP layer 1804 (see FIG. 18). The protocol stack for the UE 1701 or 1702 may further include an IP layer 1913.

A General Packet Radio Service (GPRS) Tunneling Protocol for the user plane (GTP-U) layer 1904 may be used for carrying user data within the GPRS core network and between the radio access network and the core network. The user data transported can be packets in any of IPv4, IPv6, or PPP formats. A UDP and IP security (UDP/IP) layer 1903 may provide checksums for data integrity, port numbers for addressing different functions at the source and destination, and encryption and authentication on the selected data flows. The RAN node 1711 or 1712 and the S-GW 1722 may utilize an S1-U interface to exchange user plane data via a protocol stack including the L1 layer 1811, the L2 layer 1812, the UDP/IP layer 1903, and the GTP-U layer 1904. The S-GW 1722 and the P-GW 1723 may utilize an S5/S8a interface to exchange user plane data via a protocol stack including the L1 layer 1811, the L2 layer 1812, the UDP/IP layer 1903, and the GTP-U layer 1904. The protocol stack for the P-GW 1723 may further include the IP layer 1913. As discussed above with respect to FIG. 18, NAS protocols support the mobility of the UE 1701 or 1702 and the session management procedures to establish and maintain IP connectivity between the UE 1701 or 1702 and the P-GW 1723.

Figure 20:
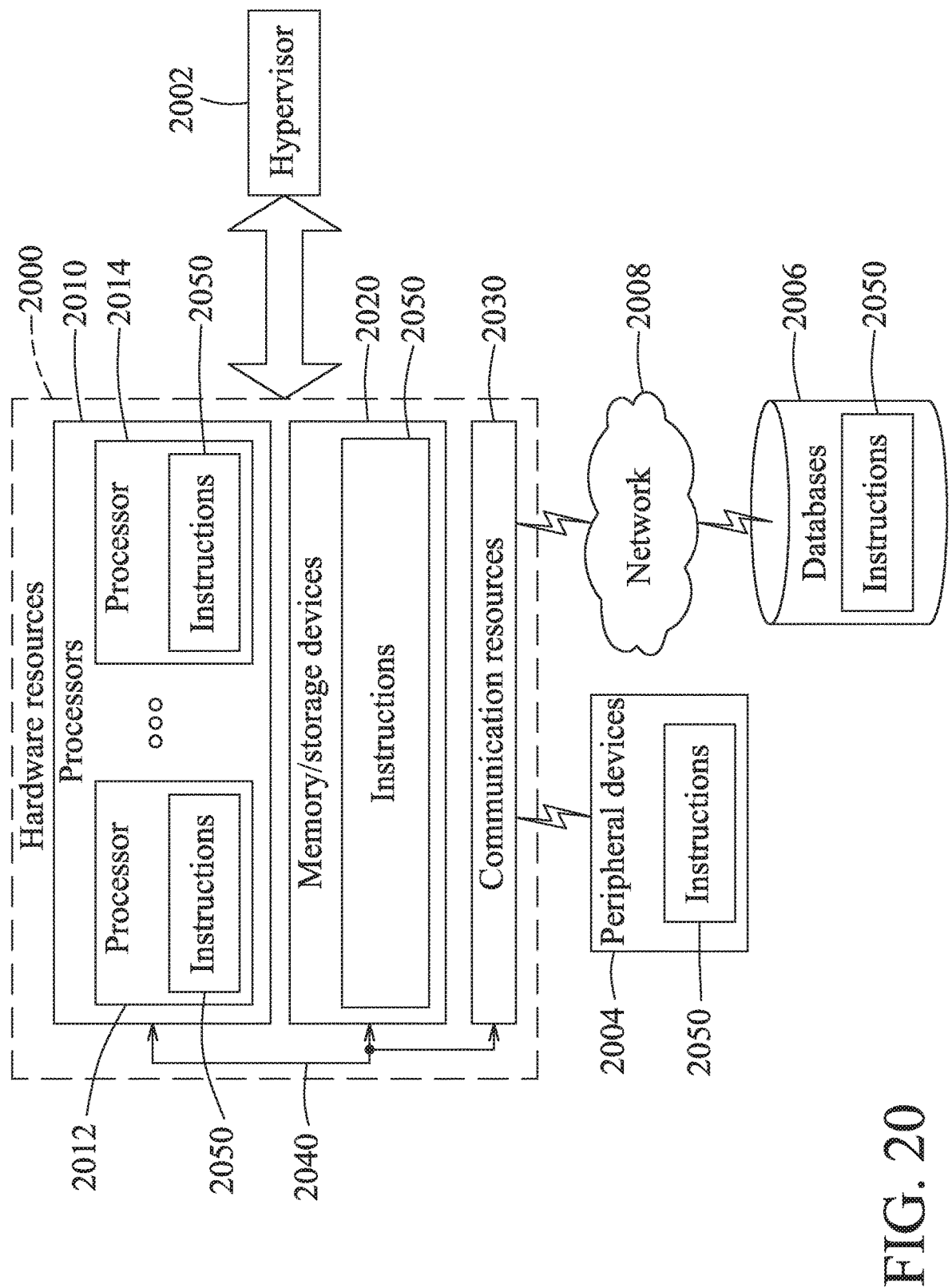
FIG. 20 is a block diagram illustrating components, according to some example embodiments, able to read instructions from a machine-readable or computer-readable medium and perform any one or more of the methodologies discussed herein.

FIG. 20 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 20 shows a diagrammatic representation of hardware resources 2000 including one or more processors (or processor cores) 2010, one or more memory/storage devices 2020, and one or more communication resources 2030, each of which may be communicatively coupled via a bus 2040. For embodiments where node virtualization (e.g., NFV) is utilized, a hypervisor 2002 may be executed to provide an execution environment for one or more network slices/sub-slices to utilize the hardware resources 2000.

The processors 2010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 2012 and a processor 2014.

The memory/storage devices 2020 may include main memory, disk storage, or any suitable combination thereof. The memory/storage devices 2020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 2030 may include interconnection or network interface components or other suitable devices to communicate with one or more peripheral devices 2004 or one or more databases 2006 via a network 2008. For example, the communication resources 2030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 2050 may comprise software, a program, an application, an applet, an app, or other executable code for causing at least any of the processors 2010 to perform any one or more of the methodologies discussed herein. The instructions 2050 may reside, completely or partially, within at least one of the processors 2010 (e.g., within the processor's cache memory), the memory/storage devices 2020, or any suitable combination thereof. Furthermore, any portion of the instructions 2050 may be transferred to the hardware resources 2000 from any combination of the peripheral devices 2004 or the databases 2006. Accordingly, the memory of processors 2010, the memory/storage devices 2020, the peripheral devices 2004, and the databases 2006 are examples of computer-readable and machine-readable media.

EXAMPLES

The following examples pertain to specific technology embodiments and point out specific features, elements, or actions that can be used or otherwise combined in achieving such embodiments.

Example 1 is an apparatus of a radio access network (RAN) node for ultra-reliable low-latency communication. The apparatus includes baseband circuitry that includes one or more processors to configure, via a radio resource control (RRC) layer, at least one downlink control information (DCI) for scheduling transmission of at least one physical downlink shared channel (PDSCH) content, where each of the at least one PDSCH content has same information. For each of the at least one DCI, the one or more processors are to determine a control resource set (CORESET) for transmitting the DCI. The baseband circuitry further includes a radio frequency (RF) interface to receive downlink data from the one or more processors, including the at least one DCI.

Example 2 is the apparatus of Example 1, wherein the one or more processors of the baseband circuitry are to configure the at least one DCI to include multiple DCIs that have the same DCI content for scheduling transmission of the same PDSCH content within one bandwidth part, and to determine different CORESETs within the bandwidth part respectively for transmitting the DCIs.

Example 3 is the apparatus of Example 2, wherein the one or more processors of the baseband circuitry are to determine one component carrier for transmitting the DCIs.

Example 4 is the apparatus of Example 2, wherein the one or more processors of the baseband circuitry are to determine different component carriers respectively for transmitting the DCIs.

Example 5 is the apparatus of Example 1, wherein the one or more processors of the baseband circuitry are to configure the at least one DCI to include multiple DCIs that have same DCI content and that are respectively for scheduling transmission of multiple PDSCH contents having same information respectively within different bandwidth parts, and to determine multiple CORESETs respectively within the bandwidth parts and respectively for transmitting the DCIs.

Example 6 is the apparatus of Example 1, wherein the one or more processors of the baseband circuitry are to configure the at least one DCI to include one DCI for scheduling transmission of multiple PDSCH contents having same information respectively within different bandwidth parts, and to determine the CORESET within one of the bandwidth parts for transmitting the DCI.

Example 7 is the apparatus of Example 1, wherein the RF interface is to provide the at least one DCI and the at least one PDSCH content to a transmitter for transmission to a user equipment (UE), and the one or more processors are further to indicate to the UE, by RRC data specific to the UE, as to whether to perform soft combining of the at least one DCI and whether to perform soft combining of the at least one PDSCH content.

Example 8 is an apparatus of user equipment (UE) for ultra-reliable low-latency communication. The apparatus includes baseband circuitry that includes a radio frequency (RF) interface to receive at least one downlink control information (DCI) for scheduling downlink transmission, and to receive at least one physical downlink shared channel (PDSCH) content each having same information according to the at least one DCI. The baseband circuitry further includes one or more processors to selectively perform soft combining of the at least one DCI and selectively perform soft combining of the at least one PDSCH content.

Example 9 is the apparatus of Example 8, wherein the one or more processors of the baseband circuitry are configured by radio resource control (RRC) data specific to the UE to selectively perform soft combining of the at least one DCI and to selectively perform soft combining of the at least one PDSCH content.

Example 10 is the apparatus of Example 8, wherein the one or more processors of the baseband circuitry are to selectively perform soft combining of the at least one PDSCH content according to the at least one DCI.

Example 11 is the apparatus of Example 10, wherein, when the at least one DCI has multiple DCIs with the same DCI content pointing to same PDSCH resource allocation for the downlink transmission, the one or more processors of the baseband circuitry are to process only one of the at least one PDSCH content.

Example 12 is the apparatus of Example 10, wherein, when the at least one DCI has multiple DCIs with different DCI contents, the one or more processors of the baseband circuitry are to process the at least one PDSCH content according to one of the DCIs.

Example 13 is the apparatus of Example 8, wherein the one or more processors of the baseband circuitry are to perform soft combining of the at least one DCI according to predefined association among multiple physical downlink control channel (PDCCH) candidates respectively in different control resource sets.

Example 14 is an apparatus of a radio access network (RAN) node for ultra-reliable low-latency communication in a frequency division duplex system. The apparatus comprising baseband circuitry that includes one or more processors to configure a downlink control information (DCI) for scheduling data transmission using blank resource of a self-contained slot structure, and to determine a control resource set (CORESET) for transmitting the DCI in a first slot. The baseband circuitry further includes a radio frequency (RF) interface to receive downlink data from the one or more processors, including the DCI.

Example 15 is the apparatus of Example 14, wherein the one or more processors of the baseband circuitry are to configure a first DCI for slot-based scheduling of transmission of a first physical downlink shared channel (PDSCH) content in the first slot, and to configure a second DCI for non-slot-based scheduling of transmission of a second PDSCH content within blank resource of the first slot.

Example 16 is the apparatus of Example 14, wherein the one or more processors of the baseband circuitry are to determine the CORESET in the middle of the first slot for transmitting the DCI, and to configure the DCI for non-slot-based scheduling of transmission of a physical uplink shared channel (PUSCH) content within blank resource of a second slot immediately next to the first slot.

Example 17 is the apparatus of Example 14, wherein the one or more processors of the baseband circuitry are to configure the DCI for scheduling uplink data transmission in the first slot and a second slot immediately next to the first slot across slot boundary between the first and second slots.

Example 18 is the apparatus of Example 14, wherein the one or more processors of the baseband circuitry are to configure the DCI for scheduling first uplink data transmission in the first slot and scheduling second uplink data transmission in blank resource of a second slot immediately next to the first slot.

Example 19 is an apparatus of a radio access network (RAN) node for ultra-reliable low-latency communication in a frequency division duplex system. The apparatus includes baseband circuitry that includes one or more processors to configure a downlink control information (DCI) for scheduling data transmission of a transport block (TB), and to divide the TB into a plurality of code block groups (CBGs). The baseband circuitry further includes a radio frequency (RF) interface to receive downlink data from the one or more processors, including the DCI.

Example 20 is the apparatus of Example 19, wherein the one or more processors of the baseband circuitry are to group the CBGs into a first part of CBGs and a second part of CBGs. The RF interface is further to receive a first physical uplink control channel (PUCCH) content carrying hybrid automatic repeat request (HARQ) feedback for the first part of CBGs, and a second PUCCH content carrying HARQ feedback for the second part of CBGs.

Example 20 is the apparatus of Example 20, wherein the one or more processors of the baseband circuitry are further to configure the DCI to indicate resource allocation for transmission of the first PUCCH content and the second PUCCH content.

Example 22 is an apparatus of a user equipment (UE) for ultra-reliable low-latency communication in a frequency division duplex system. The apparatus includes baseband circuitry that includes a radio frequency (RF) interface to receive a downlink control information (DCI) for scheduling data transmission of a transport block (TB), and to receive a plurality of code block groups (CBGs) of the TB. The baseband circuitry further includes one or more processors to decode the CBGs and to configure uplink control data to carry separate hybrid automatic repeat request (HARQ) feedback for the CBGs.

Example 23 is the apparatus of Example 22, wherein the one or more processors of the baseband circuitry are to configure the uplink control data to include multiple bits to respectively indicate whether the CBGs are successfully decoded.

Example 24 is the apparatus of Example 22, wherein the one or more processors of the baseband circuitry are to configure the uplink control data to include a first physical uplink control channel (PUCCH) content carrying HARQ feedback for a first part of the CBGs, and a second PUCCH content carrying HARQ feedback for a second part of the CBGs.

Example 25 is the apparatus of Example 24, wherein the one or more processors of the baseband circuitry are further to allocate resource for transmission of the first and second PUCCH contents according to the DCI.

Example 26 is the apparatus of Example 24, wherein the one or more processors of the baseband circuitry are further to allocate resource for transmission of the first PUCCH content according to the DCI, and to derive resource allocation for transmission of the second PUCCH content from resource allocation for the first PUCCH content.

Example 27 is a mechanism for enhancing reliability on downlink control channel for URLLC, where first and second DCIs are configured to schedule the same PDSCH content, and the first DCI and the second DCI are transmitted in first and second CORESETs, respectively. In particular, the first and second CORESETs are located within a same BWP.

Example 28 is a mechanism for enhancing reliability on downlink control channel for URLLC, where first and second DCIs are transmitted in first and second CCs, respectively, and are used to schedule the same PDSCH content to be transmitted in the first CC. The first DCI is transmitted in a first CORESET in the first CC, and the second DCI is transmitted in a second CORESET in the second CC.

Example 29 is the mechanism of Example 28, wherein cross-carrier scheduling is employed for the second DCI in the second CC.

Example 30 is a mechanism for enhancing reliability on downlink control channel for URLLC, where two PDCCH candidates are defined for AL4 in each CORESET, first and second PDCCH candidates for AL4 in the first CORESET are associated with the first and second PDCCH candidates for AL4 in the second CORESET, respectively.

Example 31 is a mechanism for enhancing reliability on data channel for URLLC, where a first DCI in a first BWP is used to schedule transmission of the PDSCH content in the first BWP, and a second DCI in a second BWP is used to schedule transmission of the PDSCH content in the second BWP.

Example 32 is a mechanism for enhancing reliability on data channel for URLLC, where the DCI in the first BWP is used to schedule the PDSCH content in the first BWP and the PDSCH content in the second BWP. The PDSCH content in the first BWP and the PDSCH content in the second BWP carry the same information.

While the present techniques have been described with respect to a limited number of embodiments, those skilled in the art can appreciate numerous modifications and variations therefrom. It is intended that the appended claims cover all such modifications and variations as falling within the true spirit and scope of the present techniques.

In the foregoing specification, a detailed description has been given with reference to specific embodiments. It can, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiments and other language does not necessarily refer to the same embodiment or the same example, but may refer to different and distinct embodiments, as well as potentially the same embodiment.

What is claimed is:

1. A method, comprising:
   receiving configuration information for multiple control resource sets (CORESETs) in a bandwidth part (BWP), the multiple CORESETS including a first CORESET and a second CORESET;
   receiving a first DCI in the first CORESET, the first DCI scheduling a first physical downlink shared channel (PDSCH) transmission;
   receiving a second DCI in the second CORESET, the second DCI scheduling the first PDSCH transmission; and
   receiving the first PDSCH transmission within the BWP according to the first DCI and the second DCI, wherein the first DCI and the second DCI have the same DCI content for scheduling the first PDSCH transmission within one BWP.

2. The method of claim 1, wherein the first DCI is transmitted using a first beam and the second DCI is transmitted using a second beam.

3. The method of claim 1, wherein the first DCI is received in a first search space according to a first physical downlink control channel (PDCCH) candidate, wherein the second DCI is received in a second search space according to a second PDCCH candidate.

4. The method of claim 3, wherein an association between the first search space and the second search space is configured by radio resource control (RRC) signaling.

5. The method of claim 3, wherein the first PDCCH candidate and the second PDCCH candidate have the same aggregation level.

6. The method of claim 1, further comprising:
   performing soft combing on the first DCI and the second DCI.

7. The method of claim 1, wherein the first DCI employs cross carrier scheduling.

8. A baseband processor configured to perform operations, the operations comprising:
   receiving configuration information for multiple control resource sets (CORESETs) in a bandwidth part (BWP), the multiple CORESETS including a first CORESET and a second CORESET;
   receiving a first DCI in the first CORESET, the first DCI scheduling a first physical downlink shared channel (PDSCH) transmission;

receiving a second DCI in the second CORESET, the second DCI scheduling the first PDSCH transmission; and receiving the first PDSCH transmission within the BWP according to the first DCI and the second DCI, wherein the first DCI and the second DCI have the same DCI content for scheduling the first PDSCH transmission within one BWP.

9. The baseband processor of claim 8, wherein the first DCI is transmitted using a first beam and the second DCI is transmitted using a second beam.

10. The baseband processor of claim 8, wherein the first DCI is received in a first search space according to a first physical downlink control channel (PDCCH) candidate, wherein the second DCI is received in a second search space according to a second PDCCH candidate.

11. The baseband processor of claim 10, wherein an association between the first search space and the second search space is configured by radio resource control (RRC) signaling.

12. The baseband processor of claim 10, wherein the first PDCCH candidate and the second PDCCH candidate have the same aggregation level.

13. The baseband processor of claim 8, the operations further comprising:
performing soft combing on the first DCI and the second DCI.

14. The baseband processor of claim 8, wherein the first DCI employs cross carrier scheduling.

15. A method, comprising:
transmitting configuration information for multiple control resource sets (CORESETs) in a bandwidth part (BWP), the multiple CORESETS including a first CORESET and a second CORESET;

transmitting a first DCI in the first CORESET, the first DCI scheduling a first physical downlink shared channel (PDSCH) transmission;

transmitting a second DCI in the second CORESET, the second DCI scheduling the first PDSCH transmission; and transmitting the first PDSCH transmission within the BWP according to the first DCI and the second DCI, wherein the first DCI and the second DCI have the same DCI content for scheduling the first PDSCH transmission within one BWP.

16. The method of claim 15, wherein the first DCI is transmitted using a first beam and the second DCI is transmitted using a second beam.

17. The method of claim 15, wherein the first DCI is transmitted in a first search space according to a first physical downlink control channel (PDCCH) candidate, wherein the second DCI is transmitted in a second search space according to a second PDCCH candidate.

18. The method of claim 17, wherein an association between the first search space and the second search space is configured by radio resource control (RRC) signaling.

* * * * *